US011070111B2

(12) United States Patent
Kobayashi et al.

(10) Patent No.: US 11,070,111 B2
(45) Date of Patent: Jul. 20, 2021

(54) ELECTRIC PUMP DEVICE

(71) Applicant: NIDEC TOSOK CORPORATION, Kanagawa (JP)

(72) Inventors: Yoshiyuki Kobayashi, Kanagawa (JP); Hitoshi Sakamoto, Kanagawa (JP); Tomohiro Sakata, Kanagawa (JP); Chisato Sekiguchi, Kanagawa (JP); Hirotaka Kanamono, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 182 days.

(21) Appl. No.: 16/579,878

(22) Filed: Sep. 24, 2019

(65) Prior Publication Data
US 2020/0106345 A1   Apr. 2, 2020

(30) Foreign Application Priority Data

Sep. 28, 2018   (JP) .............................. JP2018-185801

(51) Int. Cl.
*H02K 9/22* (2006.01)
*H02K 3/46* (2006.01)
*H02K 7/14* (2006.01)
*H02K 11/33* (2016.01)

(52) U.S. Cl.
CPC ................. *H02K 9/22* (2013.01); *H02K 3/46* (2013.01); *H02K 7/14* (2013.01); *H02K 11/33* (2016.01)

(58) Field of Classification Search
CPC ............. H02K 9/22; H02K 11/33; H02K 3/46
See application file for complete search history.

(56) References Cited

U.S. PATENT DOCUMENTS

| 6,411,507 | B1 * | 6/2002 | Akram ................ H01L 23/3675 361/690 |
| 7,023,699 | B2 * | 4/2006 | Glovatsky .......... H05K 7/20454 165/185 |
| 9,345,150 | B2 * | 5/2016 | Fukumasu .............. B60L 1/003 |
| 9,425,672 | B2 * | 8/2016 | Sahara .................... H02K 29/08 |
| 9,479,025 | B2 * | 10/2016 | Kawata .................. H02K 11/20 |
| 10,128,720 | B2 * | 11/2018 | Ishizeki ................. F04C 15/008 |
| 10,199,904 | B2 * | 2/2019 | Sasaki .................... H05K 1/181 |

(Continued)

FOREIGN PATENT DOCUMENTS

JP   2016039672   3/2016

*Primary Examiner* — Robert W Horn
(74) *Attorney, Agent, or Firm* — JCIPRNET

(57) ABSTRACT

An inverter substrate has a plurality of heat generating elements mounted thereon and disposed at intervals from each other. A housing has an inverter housing section that accommodates the inverter substrate. The inverter housing section has a first member that faces one plate surface of a pair of plate surfaces of the inverter substrate, a second member that faces the other plate surface of the pair of plate surfaces, and a plurality of heat conductive sheets that are disposed between the first member or the second member and the inverter substrate and are brought into contact with the first member or the second member and the inverter substrate. The heat conductive sheets are thermally connected to the heat generating elements. The heat conductive sheets are individually disposed at positions at which the heat conductive sheets overlap the plurality of heat generating elements in a plan view of the inverter substrate.

9 Claims, 10 Drawing Sheets

(56) References Cited

U.S. PATENT DOCUMENTS

| | | | |
|---|---|---|---|
| 10,236,750 B2* | 3/2019 | Hirotani | B62D 5/0406 |
| 10,320,254 B2* | 6/2019 | Nakano | H02K 7/14 |
| 10,389,212 B2* | 8/2019 | Ishimoto | H02K 5/08 |
| 10,396,636 B2* | 8/2019 | Isogai | H02K 5/04 |
| 10,461,611 B2* | 10/2019 | Hieda | H02K 9/22 |
| 10,673,309 B2* | 6/2020 | Akutsu | H02K 7/003 |
| 2011/0285223 A1* | 11/2011 | Miyachi | H02K 11/33 310/64 |
| 2013/0033823 A1* | 2/2013 | Nagashima | H05K 7/20854 361/714 |
| 2015/0257309 A1* | 9/2015 | Bass | H05K 7/20436 165/185 |
| 2020/0106321 A1* | 4/2020 | Homma | H02K 11/33 |
| 2020/0106345 A1* | 4/2020 | Kobayashi | H02K 7/14 |
| 2021/0013782 A1* | 1/2021 | Kobayashi | F04B 35/04 |
| 2021/0016428 A1* | 1/2021 | Nakashima | B25B 21/00 |

\* cited by examiner

ELECTRIC PUMP DEVICE

CROSS-REFERENCE TO RELATED APPLICATION

This application claims the priority of Japan patent application serial no. 2018-185801, filed on Sep. 28, 2018. The entirety of the above-mentioned patent application is hereby incorporated by reference herein and made a part of this specification.

BACKGROUND

Technical Field

The present invention relates to an electric pump device.

Description of Related Art

An electric pump device includes a motor, a substrate, a housing, and a pump. In an electric oil pump device disclosed in Patent literature 1, a heat discharge sheet of a heat conductive member is caused to tightly adhere to and disposed on a front surface of a control substrate in an axial direction with the heat discharge sheet interposed in a metal case. The heat discharge sheet delivers heat generated by an electronic circuit component to the metal case. A heat generating element in the electronic circuit component is, for example, an FET or the like.

[Patent literature 1] Japanese Patent Laid-Open No. 2016-39672

For example, a switching element such as an FET is an electronic component with a large amount of self-heat-generation. In a case in which a single heat conductive sheet is used for such a switching element, there is a concern that a reaction force of the heat conductive sheet will act on the substrate and the substrate will be deformed.

SUMMARY

In view of the aforementioned circumstances, an objective of the invention is to provide an electric pump device capable of reducing a reaction force of heat conductive sheets and curbing deformation of an inverter substrate.

According to an aspect of the invention, there is provided an electric pump device including: a motor; an inverter substrate that is electrically connected to the motor; a housing that accommodates the motor and the inverter substrate; and a pump section that is driven by motive power of the motor, in which the inverter substrate has a plurality of heat generating elements that are mounted on the inverter substrate and are disposed at intervals from each other, the housing has an inverter housing section that accommodates the inverter substrate, the inverter housing section has a first member that faces one plate surface of a pair of plate surfaces of the inverter substrate, a second member that faces the other plate surface of the pair of surfaces, and a plurality of heat conductive sheets that are disposed between the first member or the second member and the inverter substrate and are brought into contact with the first member or the second member and the inverter substrate, the heat conductive sheets are thermally connected to the heat generating elements, and the plurality of heat conductive sheets are individually disposed at positions at which the heat conductive sheets overlap the plurality of heat generating elements in a plan view of the inverter substrate.

According to the electric pump device of the aspect of the invention, it is possible to reduce a reaction force of the heat conductive sheets and to curb deformation of the inverter substrate.

DESCRIPTION OF EMBODIMENTS

Figure 1:
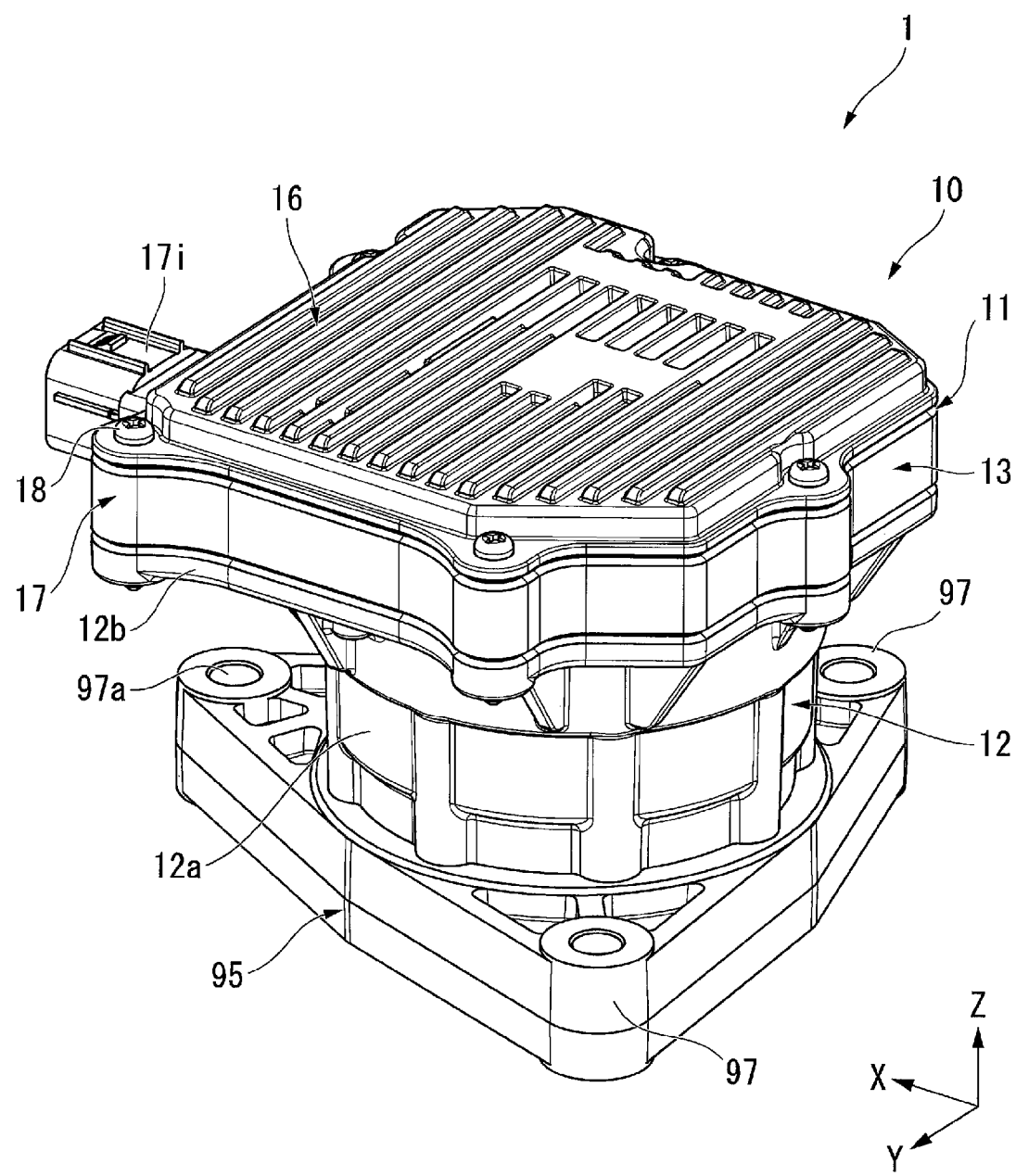
FIG. 1 is a perspective view illustrating a motor unit and an electric pump device according to an embodiment.
Figure 2:
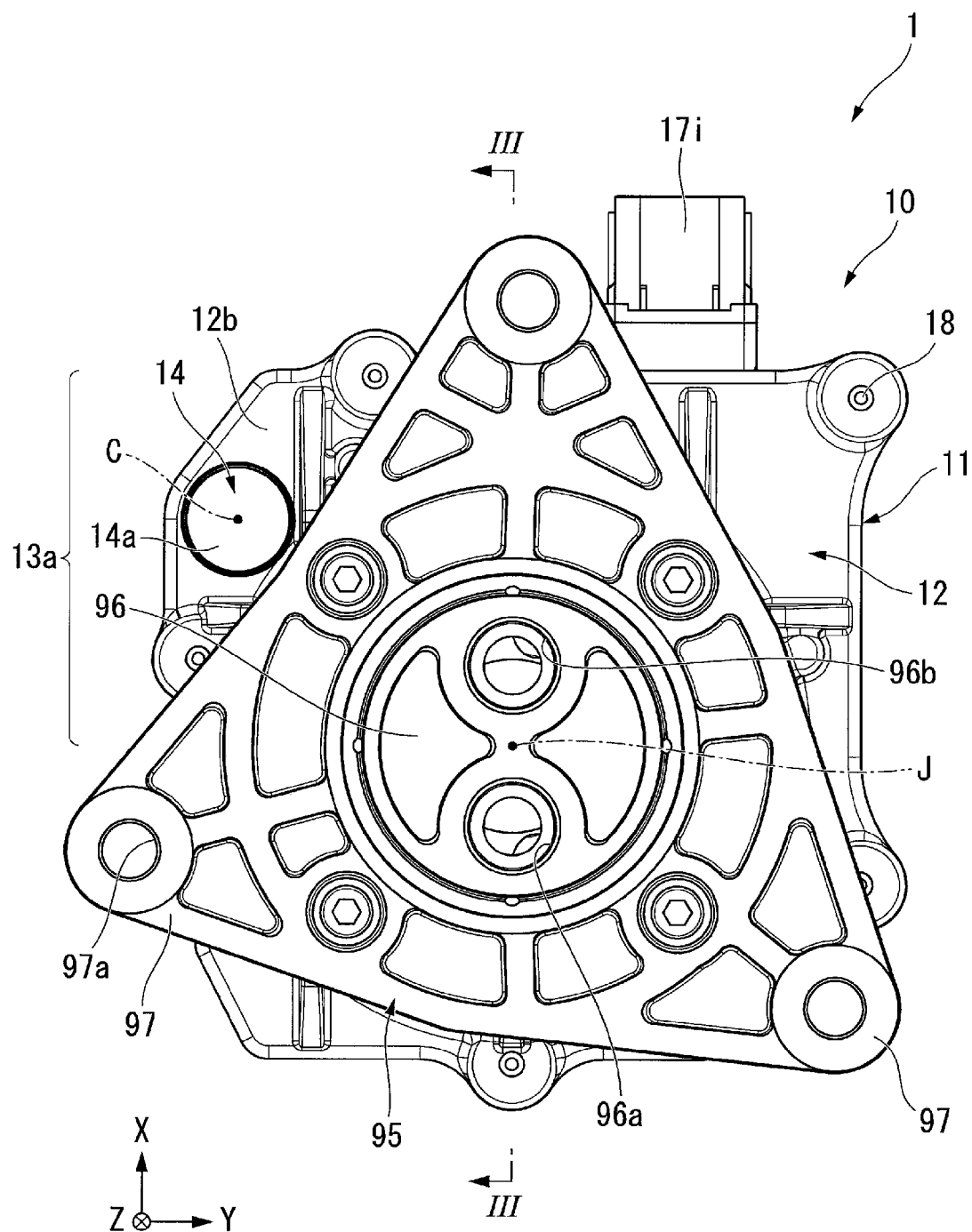
FIG. 2 is a front view illustrating the motor unit and the electric pump device according to the embodiment.
Figure 3:
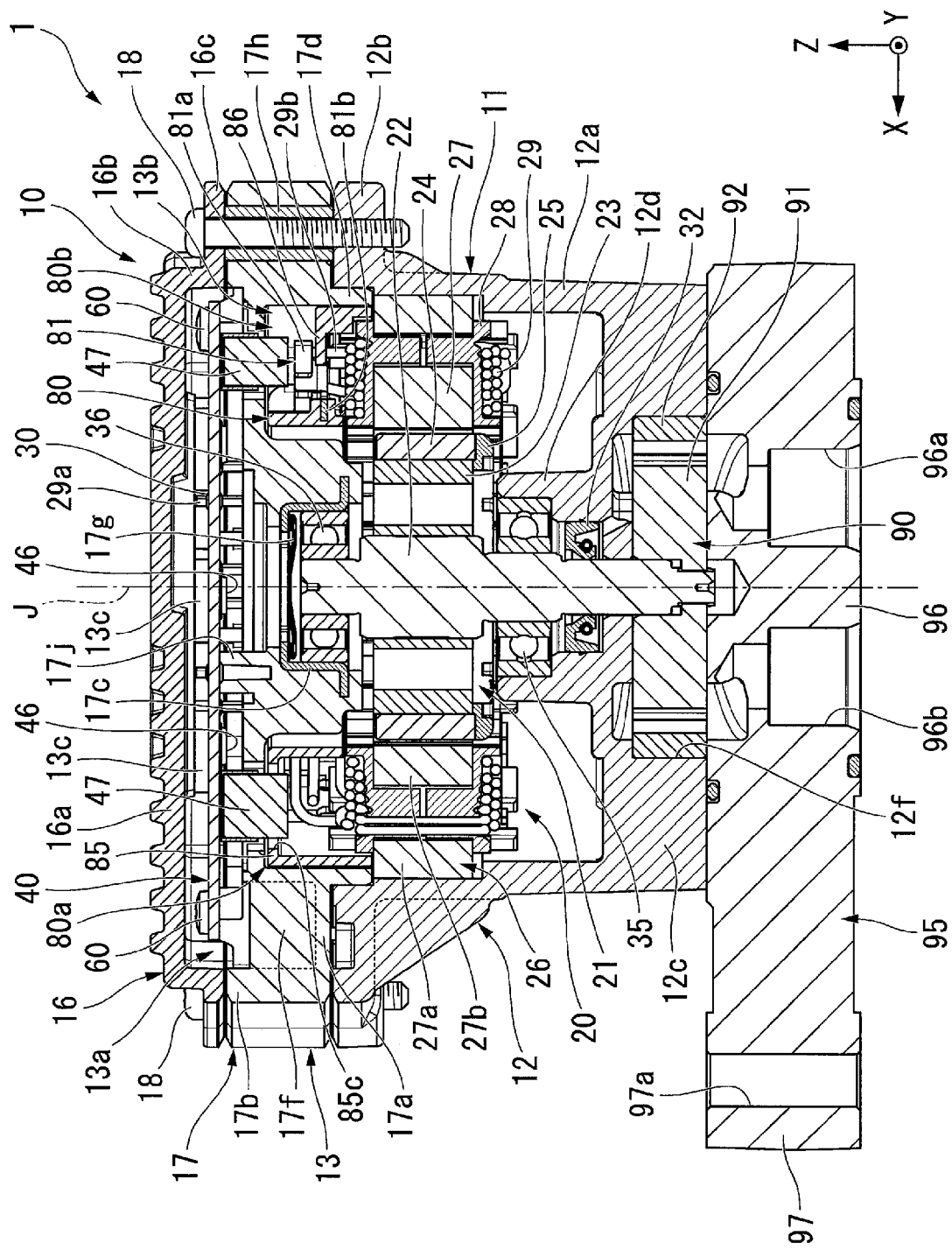
FIG. 3 is a vertical sectional view illustrating a section taken along III-III in FIG. 2.
Figure 4:
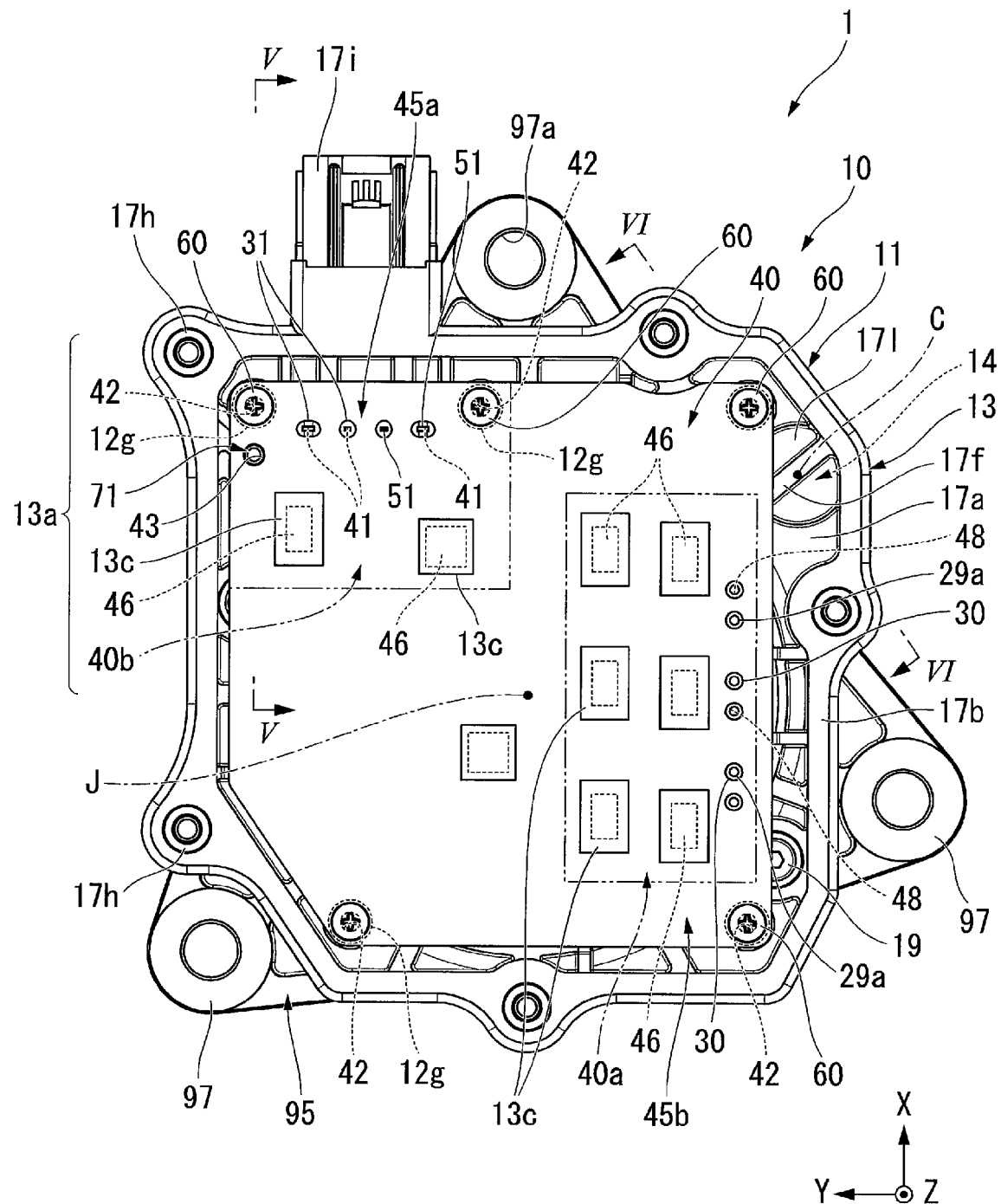
FIG. 4 is a back view (plan view) illustrating the motor unit and the electric pump device according to the embodiment and illustrates a state in which a first member and the like of an inverter housing section have been removed from the device.

A motor unit 10 and an electric pump device 1 provided with the motor unit 10 according to an embodiment of the invention will be described with reference to drawings. In the drawings, XYZ coordinate systems will be appropriately illustrated as three-dimensional orthogonal coordinate systems. The motor unit 10 and the electric pump device 1 include a motor 20 and an inverter substrate 40. The motor 20 has a central axis J, and the central axis J extends along a Z-axis direction. In the following description, the direction parallel to the central axis J will be simply referred to as an "axial direction" unless otherwise particularly stated. The position of the motor 20 in the axial direction and the position of the inverter substrate 40 in the axial direction are different from each other. That is, the motor 20 and the inverter substrate 40 are aligned in the axial direction. In the axial direction, a direction from the motor 20 toward the inverter substrate 40 will be referred to as toward one side (+Z side) in the axial direction, and a direction from the inverter substrate 40 toward the motor 20 will be referred to as toward the other side (−Z side) in the axial direction. The radial direction around the central axis J will be simply referred to as a "radial direction". In the radial direction, a direction toward the central axis J will be referred to as inward in the radial direction, and a direction away from the central axis J will be referred to as outward in the radial direction. A circumferential direction around the central axis J, that is, turning around the central axis J will be simply referred to as a "circumferential direction". Also, a "parallel direction" includes a substantially parallel direction, and an "orthogonal direction" includes a substantially orthogonal direction, in the embodiment.

The electric pump device 1 according to the embodiment suctions and ejects a fluid such as an oil, for example. The electric pump device 1 has a function of circulating the fluid through a flow path, for example. In a case in which the fluid is an oil, the electric pump device 1 may be referred to as an electric oil pump device instead. Although not particularly illustrated in the drawing, the electric pump device 1 is provided in a drive device or the like of a vehicle, for example. That is, the electric pump device 1 is mounted in the vehicle.

As illustrated in FIGS. 1 to 9, the motor unit 10 includes a housing 11, fastening screws 18, fixing screws 19, a motor 20, an inverter substrate 40, wiring members 50, screw members 60, and a coil support 80. The electric pump device 1 includes a motor unit 10, a pump section 90, and a pump cover 95. That is, the electric pump device 1 includes the housing 11, the fastening screws 18, the fixing screws 19, the motor 20, the inverter substrate 40, the wiring members 50, the screw members 60, the coil support 80, the pump section 90, and the pump cover 95. In the embodiment, a pair of plate surfaces of the inverter substrate 40 are directed in the axial direction. One plate surface of the pair of plate surfaces of the inverter substrate 40 is directed to one side in the axial direction. The other plate surface of the pair of plate surfaces of the inverter substrate 40 is directed to the other side in the axial direction. In the embodiment, "when seen in the axial direction" has the same meaning as that of "in a plan view of the inverter substrate 40".

The housing 11 accommodates the motor 20 and the inverter substrate 40. The housing 11 has a motor housing section 12, an oil seal 32, an axis section 33, an inverter housing section 13, a breather section 14. The motor housing section 12 accommodates the motor 20. In the embodiment, the motor housing section 12 also accommodates the pump section 90. That is, the housing 11 also accommodates the pump section 90. In the embodiment, since the motor 20 and the pump section 90 are accommodated in the motor housing section 12, the structure of the electric pump device 1 can be simplified. Assembly of the electric pump device 1 is facilitated.

The motor housing section 12 is made of metal. The motor housing section 12 is made of a single member. The motor housing section 12 has an accommodation tubular section 12a, a brim section 12b, a pump accommodation wall section 12c, a bearing holding tubular section 12d, and pillar sections 12g.

The accommodation tubular section 12a has a tubular shape extending in the axial direction. In the embodiment, the accommodation tubular section 12a has a cylindrical shape. The accommodation tubular section 12a accommodates the motor 20. The brim section 12b spreads from the end of the accommodation tubular section 12a on one side in the axial direction outward in the radial direction. The brim section 12b has a plate shape with a plate surface directed in the axial direction. In the embodiment, the outer shape of the brim section 12b is a substantially polygonal shape when seen in the axial direction.

Figure 5:
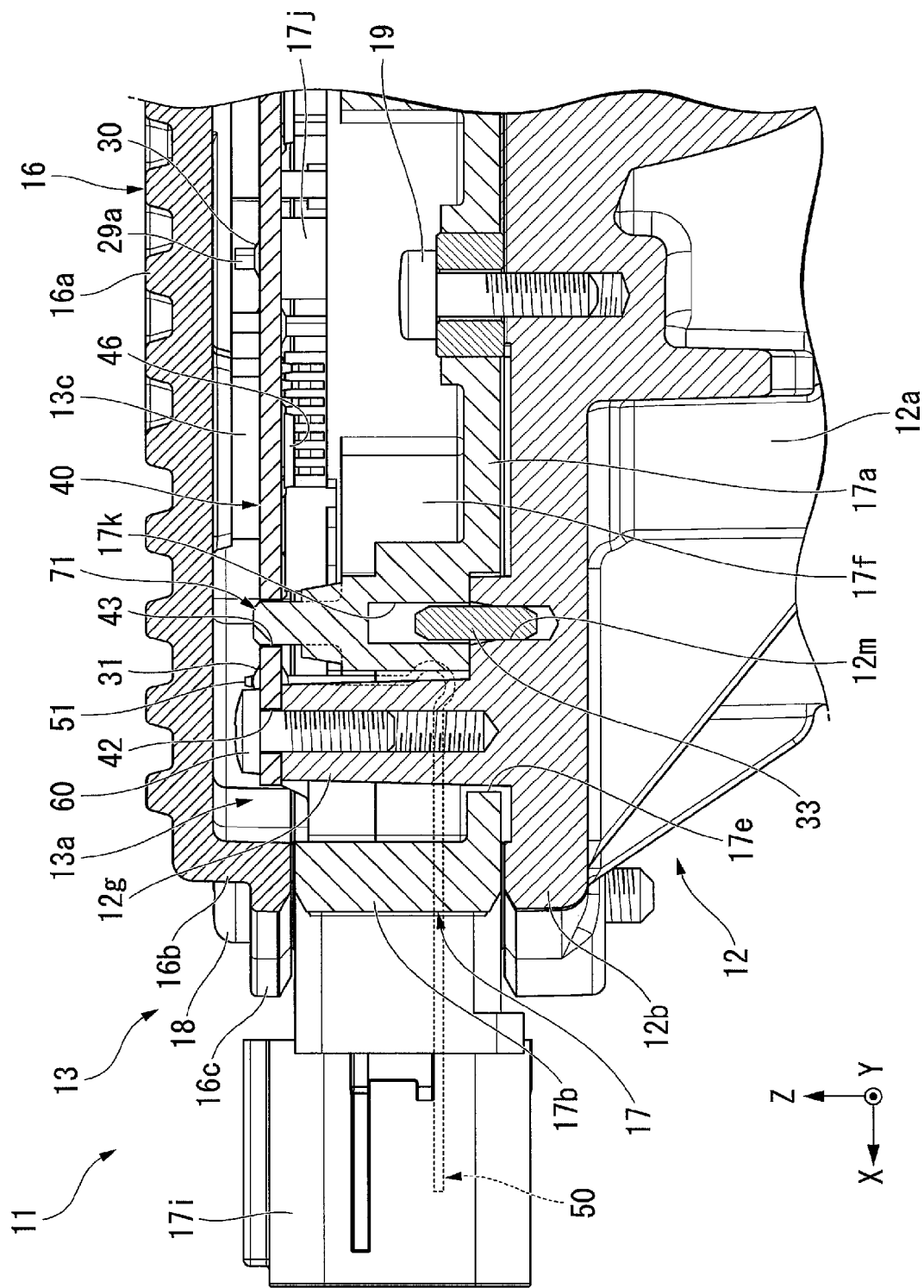
FIG. 5 is a vertical sectional view illustrating a section taken along V-V in FIG. 4.
Figure 6:
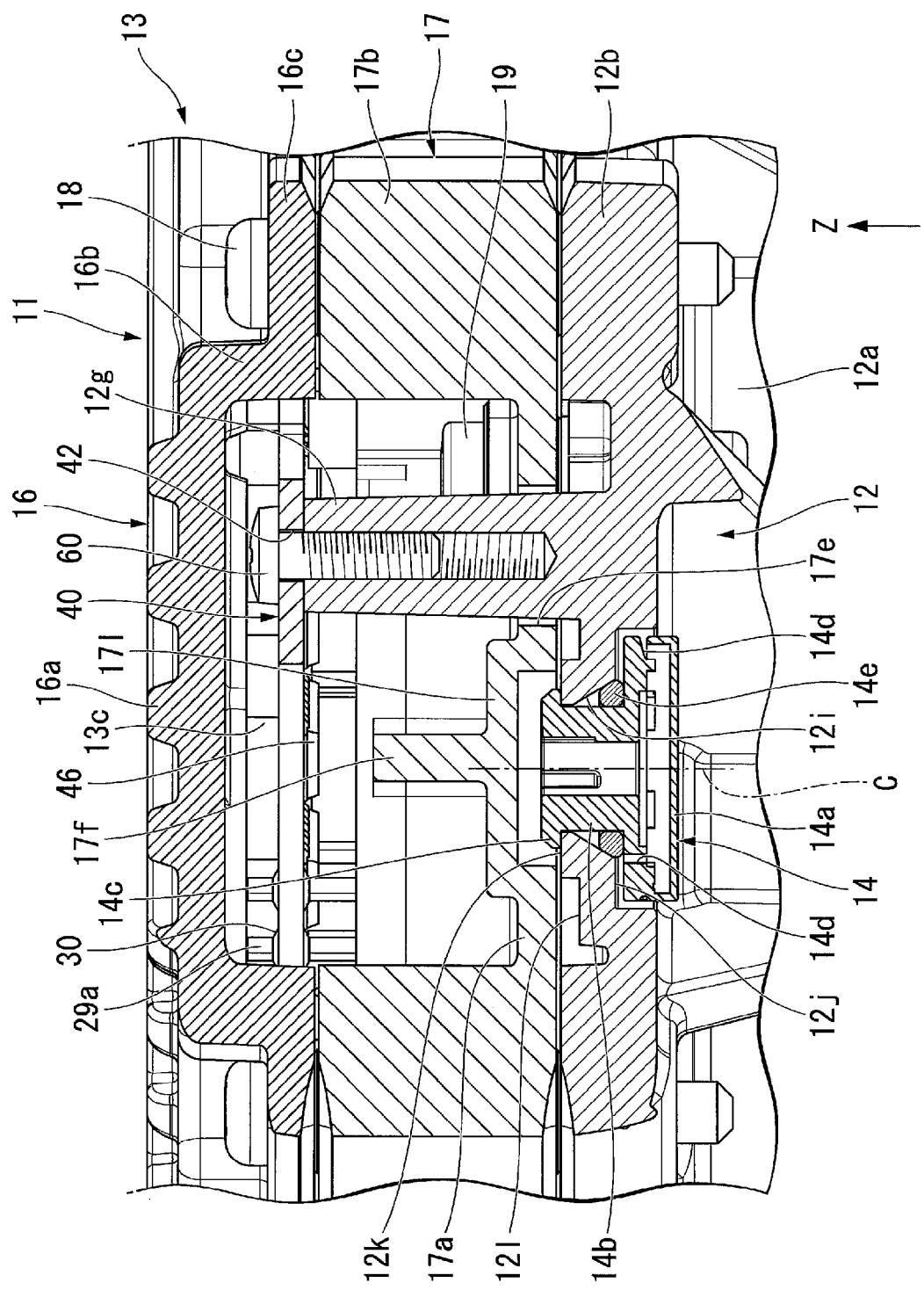
FIG. 6 is a vertical sectional view illustrating a section taken along VI-VI in FIG. 4.
Figure 7:
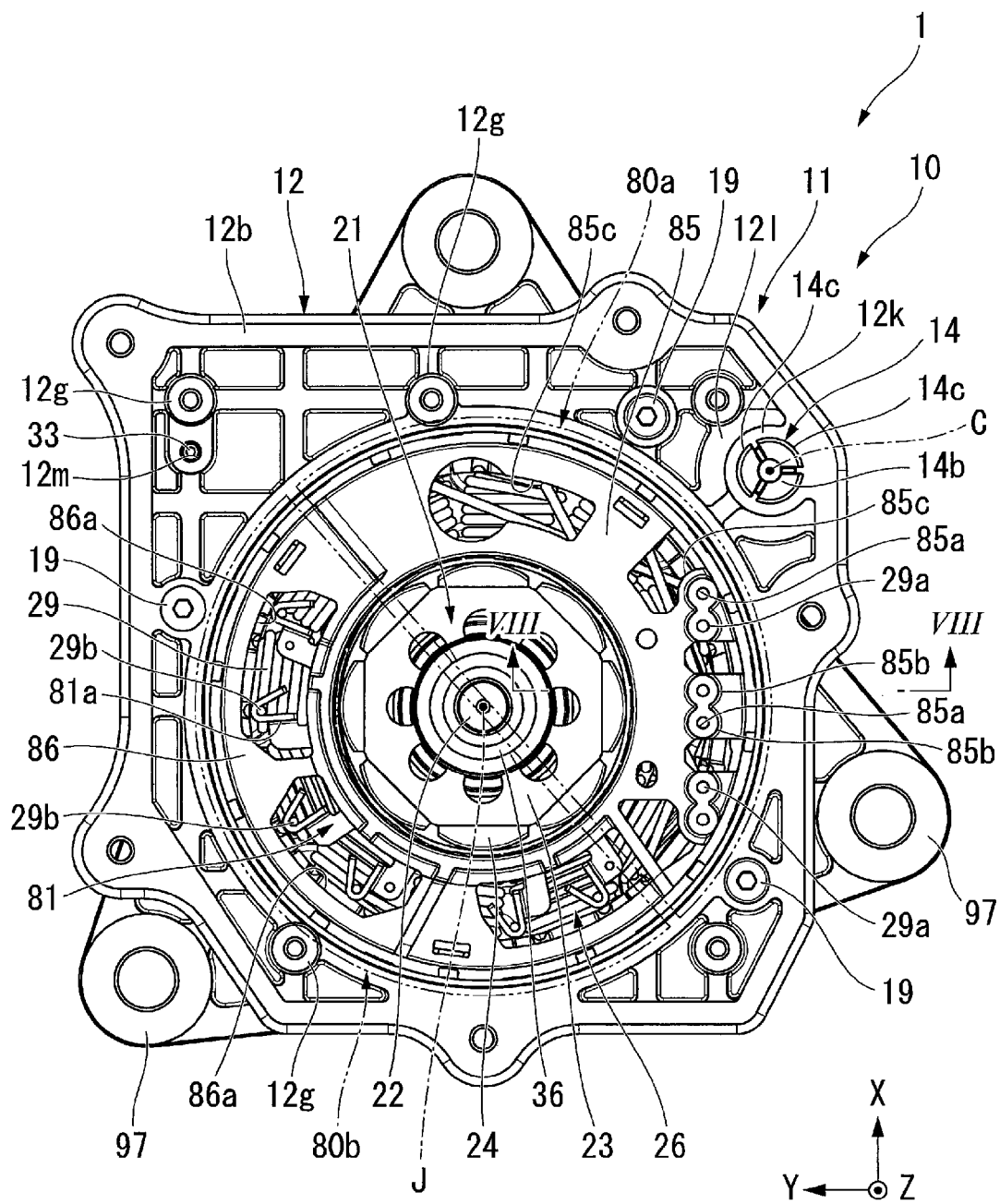
FIG. 7 is a back view illustrating the motor unit and the electric pump device according to the embodiment and illustrates a state in which the inverter housing section, the inverter substrate, and the like have been removed from the device.
Figure 8:
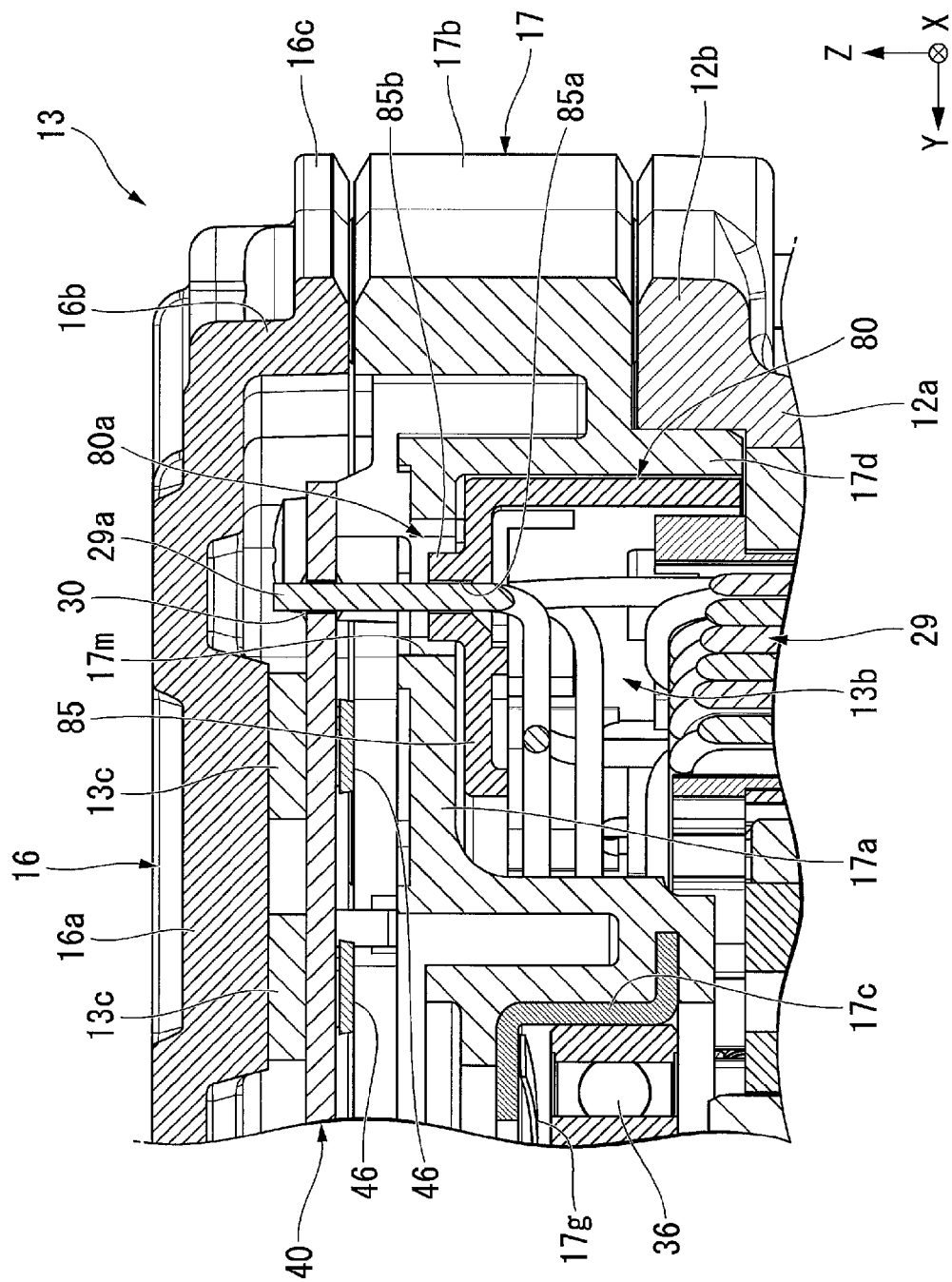
FIG. 8 is a vertical sectional view illustrating a section taken along VIII-VIII in FIG. 7.

The brim section 12b has a breather attachment hole 12i, a breather accommodation recessed section 12j, a claw support surface 12k, an outer surrounding surface 12l, and an axis section attachment hole 12m (see FIGS. 5 and 6). The breather attachment hole 12i penetrates through the brim section 12b in the axial direction. The breather attachment hole 12i has a portion with a tapered hole shape with an inner diameter increasing toward the other side in the axial direction. The breather attachment hole 12i overlaps a wiring member disposition region 13a, which will be described later, when seen in the axial direction.

The breather accommodation recessed section 12j is recessed on one side in the axial direction from the surface of the brim section 12b directed to the other side in the axial direction. The breather accommodation recessed section 12j has a circular ring shape when seen in the axial direction. The inner diameter of the breather accommodation recessed section 12j is greater than the inner diameter of the breather attachment hole 12i. The bottom surface of the breather accommodation recessed section 12j directed to the other side in the axial direction is continuous with the inner circumferential surface of the breather attachment hole 12i.

The claw support surface 12k is disposed on the surface of the brim section 12b directed to one side in the axial direction. In the embodiment, the claw support surface 12k is a plane perpendicular to the central axis J. The claw support surface 12k has a substantially annular shape when seen in the axial direction and surrounds the breather attachment hole 12i from the outside (see FIG. 7). The inner circumferential portion of the claw support surface 12k is continuous with the end (opening) of the breather attachment hole 12i on one side in the axial direction.

The outer surrounding surface 12l is disposed in the surface of the brim section 12b directed to one side in the axial direction. The outer surrounding surface 12l has substantially a C shape when seen in the axial direction. The outer surrounding surface 12l surrounds the claw support surface 12k from the breather radial direction when seen in the axial direction. Also, the breather radial direction is a radial direction around the breather central axis C as will be described later. The outer surrounding surface 12l is located on the other side in the axial direction beyond the claw support surface 12k. That is, the position of the outer surrounding surface 12l in the axial direction is located on the other side in the axial direction beyond the position of the claw support surface 12k in the axial direction.

The axis section attachment hole 12m is recessed on the other side in the axial direction from the surface of the brim section 12b on one side in the axial direction. The axis section attachment hole 12m extends in the axial direction. The axis section attachment hole 12m has a circular hole shape.

The pump accommodation wall section 12c is disposed at an end of the accommodation tubular section 12a on the other side in the axial direction. The pump accommodation wall section 12c is disposed in the accommodation tubular section 12a. The pump accommodation wall section 12c blocks an opening in the accommodation tubular section 12a on the other side in the axial direction. The pump accommodation wall section 12c has a plate shape with a plate surface directed in the axial direction. In the embodiment, the pump accommodation wall section 12c has a substantially circular plate shape. The pump accommodation wall section 12c accommodates the pump section 90. The pump accommodation wall section 12c has a pump accommodation hole 12f and a plurality of lightening holes (not illustrated).

The pump accommodation hole 12f is recessed on one side in the axial direction from the plate surface of the pump accommodation wall section 12c directed to the other side in the axial direction. In the embodiment, the pump accommodation hole 12f has a circular hole shape. The pump accommodation hole 12f is disposed at the center of the pump accommodation wall section 12c when seen in the axial direction. Although not particularly illustrated in the drawing, the plurality of lightening holes are recessed on the other side in the axial direction from the plate surface of the pump accommodation wall section 12c directed to one side in the axial direction and are disposed at intervals from each other in the circumferential direction. The plurality of lightening holes are disposed outward from the pump accommodation hole 12f in the radial direction.

The bearing holding tubular section 12d has a tubular shape extending on one side in the axial direction from the pump accommodation wall section 12c. The bearing holding tubular section 12d projects on one side in the axial direction from the plate surface of the pump accommodation wall section 12c directed to one side in the axial direction. The bearing holding tubular section 12d holds a first bearing 35, which will be described later, of the motor 20. The first bearing 35 is a bearing located on the other side of a rotor core 23, which will be described later, in the axial direction among the plurality of bearings 35 and 36 disposed in the motor 20 at intervals from each other in the axial direction. The first bearing 35 is fitted into the bearing holding tubular section 12d.

The pillar sections 12g extend in the axial direction. The pillar sections 12g are disposed at the brim section 12b and extend on one side in the axial direction from the brim section 12b. The pillar sections 12g project on one side in the axial direction from the plate surface of the brim section 12b directed to one side in the axial direction. The number of pillar sections 12g provided is a plural number. The plurality of pillar sections 12g are disposed at intervals from each other in the circumferential direction when seen in the axial direction. Specifically, the plurality of pillar sections 12g are disposed at intervals from each other at positions at which the pillar sections 12g overlap an outer circumferential portion of the inverter substrate 40 when seen in the axial direction, that is, in a plan view of the inverter substrate 40.

In the embodiment, the pillar sections 12g have substantially cylindrical shapes. The pillar sections 12g have outer diameters decreasing toward one side in the axial direction. The outer circumferential surfaces of the pillar sections 12g have tapered shapes. The pillar sections 12g have female screw sections in the inner circumferential surfaces of the pillar sections 12g. End surfaces of the pillar sections 12g directed to one side in the axial direction have plane shapes perpendicular to the central axis J. The end surfaces of the pillar sections 12g directed to one side in the axial direction are brought into contact with the plate surface of the inverter substrate 40 directed to the other side in the axial direction.

The pillar sections 12g are disposed in the inverter housing section 13. The pillar sections 12g extend inside the inverter housing section 13. The pillar sections 12g are fixed to the inverter substrate 40. According to the embodiment, since the inverter substrate 40 is fixed to the pillar sections 12g of the motor housing section 12, it is possible to enhance an attachment rigidity of the inverter substrate 40 with respect to the housing 11 and to improve vibration damping properties of the inverter substrate 40. It is possible to curb relative vibration between the stator 26, which will be described later, fixed to the motor housing section 12 through thermal fitting or the like and the inverter substrate 40. Therefore, it is possible to enhance durability of a solder 30 that fixes first ends 29a of the coils 29, which will be described later, of the stator 26 and the inverter substrate 40. In addition, it is also possible to enhance durability of a solder 31 that fixes terminals 51, which will be described later, of the wiring members 50 and the inverter substrate 40.

Also, according to the embodiment, the pillar sections 12g extend in the axial direction from the brim section 12b that is located outward in the radial direction beyond the accommodation tubular section 12a and support the inverter substrate 40. Therefore, the pillar sections 12g can stably support the inverter substrate 40 even if the inverter substrate 40 has a larger outer shape than that of the accommodation tubular section 12a.

In addition, according to the embodiment, the inverter substrate 40 is more stably supported with the plurality of pillar sections 12g. Also, since the pillar sections 12g are disposed at the outer circumferential portion of the inverter substrate 40, an influence on a degree of freedom in a wiring pattern of the inverter substrate 40 is curbed. Also, since the motor housing section 12 is made of metal, it is possible to further improve vibration damping properties of the inverter substrate 40 with the motor housing section 12 with high rigidity.

In addition, according to the embodiment, since the pillar sections 12g are a part of the motor housing section 12 made of a single member, that is, the pillar sections 12g are provided integrally with the motor housing section 12, satisfactory sealing properties around the pillar sections 12g can be maintained. Therefore, invasion of water and the like from the outside of the device to the inside of the motor housing section 12 and the inverter housing section 13 through the circumference of the pillar sections 12g can be curbed. Configurations, effects, and advantages of the pillar sections 12g other than those described above will be separately described below with description of the inverter housing section 13.

The oil seal 32 has an annular shape around the central axis J. The oil seal 32 is disposed in the bearing holding tubular section 12d and is located on the other side in the axial direction beyond the first bearing 35. The axis section 33 is a pin member extending in the axial direction. The axis section 33 is fitted into the axis section attachment hole 12m. The axis section 33 projects on one side in the axial direction from the brim section 12b.

The inverter housing section 13 accommodates the inverter substrate 40. In the embodiment, the inverter housing section 13 also accommodates the coil support 80. That is, the housing 11 also accommodates the coil support 80. The inverter housing section 13 is disposed on one side of the brim section 12b in the axial direction and overlaps the brim section 12b when seen in the axial direction. The inverter housing section 13 has a first member 16, a second member 17, and heat conductive sheets 13c. Also, the inverter housing section 13 has a wiring member disposition region 13a and a coil support accommodation space 13b.

The first member 16 may be referred to as a lid member of the inverter housing section 13 instead. The first member 16 is made of metal. The first member 16 is disposed on one side of the inverter substrate 40 in the axial direction and covers the inverter substrate 40 on one side in the axial direction. The first member 16 faces one plate surface of the pair of plate surfaces of the inverter substrate 40. The first member 16 faces one plate surface directed to one side of the inverter substrate 40 in the axial direction with a gap interposed therebetween in the axial direction. The first member 16 has a capped tubular shape.

The first member 16 has a top wall 16a, a circumferential wall 16b, and a flange 16c. The top wall 16a faces one plate surface of the inverter substrate 40. The circumferential wall 16b has a tubular shape extending on the other side in the axial direction from the outer circumferential portion of the top wall 16a. The circumferential wall 16b is disposed in a superimposed manner on the inverter substrate 40 when seen in the radial direction. The flange 16c spreads outward in the radial direction from an end of the circumferential wall 16b on the other side in the axial direction.

The second member 17 may be referred to as a main body member of the inverter housing section 13 instead. The second member 17 is located between the motor housing section 12 and the first member 16 in the axial direction. That is, the second member 17 is disposed between the motor housing section 12 and the first member 16. The second member 17 is fixed to the brim section 12b. The second member 17 is sandwiched between the brim section 12b and the flange 16c in the axial direction and is fixed with the fastening screws 18. The number of fastening screws 18 provided is a plural number. The plurality of fastening screws 18 are disposed at intervals from each other in the circumferential direction. According to the embodiment, since the second member 17 is fixed to the brim section 12b, it is possible to secure a wide region for fixing the inverter housing section 13 to the motor housing section 12 and to stably fix the inverter housing section 13 to the motor housing section 12. Also, it is possible to secure an inner volume of the inverter housing section 13 and to reduce the inverter housing section 13 in size in the axial direction.

The second member 17 is disposed on the other side of the inverter substrate 40 in the axial direction and covers the inverter substrate 40 on the other side in the axial direction. The second member 17 faces the other plate surface of the pair of plate surfaces of the inverter substrate 40. The second member 17 faces the other plate surface directed to the other side of the inverter substrate 40 in the axial direction with a gap therebetween in the axial direction. The second member 17 has a tubular shape with a bottom.

The second member 17 has a bottom wall 17a and a circumferential wall 17b. That is, the inverter housing section 13 has a bottom wall 17a and a circumferential wall 17b. The bottom wall 17a faces the other plate surface of the inverter substrate 40. That is, the bottom wall 17a faces the plate surface, which is directed to the other side in the axial direction, of the pair of plate surfaces of the inverter substrate 40. The bottom wall 17a has a plate shape with a plate surface directed in the axial direction. The bottom wall 17a is fixed to the brim section 12b with fixing screws 19. That is, the second member 17 is fixed to the motor housing section 12 with the fixing screws 19. The number of fixing screws 19 provided is a plural number. The plurality of fixing screws 19 are disposed at intervals from each other in the circumferential direction. The fixing screws 19 are used for the purpose of temporarily fixing the second member 17 to the motor housing section 12 until the inverter housing section 13 and the motor housing section 12 are fastened with the fastening screws 18. Also, the temporary fixing indicates a temporary fixing state that is required for assembly. The number of fixing screws 19 is smaller than the number of fastening screws 18. Since the second member 17 is fixed to the motor housing section 12 with the fixing screws 19, relative positions between the inverter substrate 40 fixed to the pillar sections 12g of the motor housing section 12 and the terminals 51 of the wiring members 50 held by a connector section 17i, which will be described later, of the second member 17 are stabilized, and connection of the terminals 51 to the inverter substrate 40 is facilitated.

The bottom wall 17a has a bearing holder 17c, a waved washer 17g, a fitting tubular section 17d, through-holes 17e, rib sections 17f, a pin section 71, a boss section 17j, an insertion hole 17k, a breather accommodation wall 17l, and a tubular disposition hole 17m. That is, the second member 17 has a bearing holder 17c, through-holes 17e, and a boss section 17j. In addition, the pin section 71 is provided at the inverter housing section 13.

The bearing holder 17c is made of metal. When the second member 17 is injection-molded, the bearing holder 17c is disposed in a mold, which is not illustrated, along with other metal components. By filling the mold with a molten resin and solidifying the resin, the second member 17 is insert-molded along with the bearing holder 17c. That is, the second member 17 has a portion made of the resin. According to the embodiment, since the second member 17 has the portion made of the resin, a degree of freedom in the shape of the second member 17 increases. Therefore, it is possible to easily provide the connector section 17i and the like, which will be described later, on the second member 17.

The bearing holder 17c has a capped tubular shape. The bearing holder 17c holds at least one bearing 36 of the plurality of bearings 35 and 36, which will be described later, of the motor 20. The bearing holder 17c holds the second bearing 36. The second bearing 36 is a bearing located on one side of the rotor core 23, which will be described later, in the axial direction among the plurality of bearings 35 and 36. The second bearing 36 is fitted into the bearing holder 17c.

The waved washer 17g has an annular shape around the central axis J. The waved washer 17g is disposed in the bearing holder 17c and is located between the top wall of the bearing holder 17c and the second bearing 36 in the axial direction. The waved washer 17g is brought into contact with the top wall of the bearing holder 17c and the second bearing 36 in the axial direction. The waved washer 17g biases the bearing holder 17c and the second bearing 36 in a direction in which the bearing holder 17c and the second bearing 36 are separated from each other in the axial direction.

The fitting tubular section 17d has a tubular shape extending on the other side in the axial direction from the bottom wall 17a. The fitting tubular section 17d is fitted into the accommodation tubular section 12a. In the embodiment, the fitting tubular section 17d has a cylindrical shape and is fitted to the inside of the end (opening) of the accommodation tubular section 12a on one side in the axial direction. According to the embodiment, the bearing 36 held by the bearing holder 17c of the bottom wall 17a is positioned coaxially with the central axis J of the shaft 22 by the fitting tubular section 17d of the bottom wall 17a being fitted into the accommodation tubular section 12a of the motor housing section 12. Therefore, performance of the motor 20 is stabilized.

The through-holes 17e penetrate through the bottom wall 17a in the axial direction. In the embodiment, the through-holes 17e have circular hole shapes. The number of through-holes 17e provided is a plural number. The plurality of through-holes 17e are disposed at intervals from each other in the circumferential direction when seen in the axial direction. Specifically, the plurality of through-holes 17e are disposed at intervals from each other at positions at which the through-holes 17e overlap the outer circumferential portion of the inverter substrate 40 when seen in the axial direction, that is, in a plan view of the inverter substrate 40. The pillar sections 12g are inserted into the respective through-holes 17e. That is, the pillar sections 12g are inserted into the through-holes 17e. According to the embodiment, it is possible to secure sealing properties between the inverter housing section 13 and the motor housing section 12 by causing the pillar sections 12g to pass through the through-holes 17e of the second member 17.

Also, it is possible to roughly position the inverter housing section 13 and the motor housing section 12, which improves assembling properties.

Now, the pillar sections 12g will be described. The pillar sections 12g penetrate through the second member 17. The pillar sections 12g penetrate through the bottom wall 17a of the second member 17 in the axial direction. According to the embodiment, it is possible to dispose the pillar sections 12g inside the inverter housing section 13 with a simple configuration. Also, it is possible to support the inverter substrate 40 with the pillar sections 12g. The pillar sections 12g are disposed inside the circumferential wall 17b when seen in the axial direction. The pillar sections 12g project to one side in the axial direction beyond the circumferential wall 17b when seen in the radial direction. According to the embodiment, the inverter substrate 40 supported at a tip ends of the pillar sections 12g is disposed on one side in the axial direction beyond the circumferential wall 17b of the second member 17. That is, the other plate surface of the inverter substrate 40 is located on one side in the axial direction beyond the circumferential wall 17b. Therefore, it is possible to easily see, from the radial direction, whether or not the solders 30 and 31 have appropriately reached the other plate surface of the inverter substrate 40, that is, whether or not soldering has successfully been performed at the time of soldering of the first ends 29a of the coils 29, which will be described later, and the terminals 51 to the inverter substrate 40.

The rib sections 17f project on one side in the axial direction from the plate surface of the bottom wall 17a directed to one side in the axial direction and extend along a virtual plane, which is not illustrated in the drawing, perpendicular to the central axis J. The number of rib sections 17f provided is a plural number. The plurality of rib sections 17f radially extend around the central axis J. In the embodiment, the plurality of rib sections 17f include rib sections 17f extending in the radial direction and rib sections 17f extending in directions other than the radial direction when seen in the axial direction. The plurality of rib sections 17f are disposed at intervals from each other in the circumferential direction. Ends of the rib sections 17f on the outside in the radial direction are connected to the circumferential wall 17b. End surfaces of the rib sections 17f directed to one side in the axial direction are located on the other side in the axial direction beyond the end surface of the circumferential wall 17b directed to one side in the axial direction.

The pin section 71 extends in the axial direction. The pin section 71 extends on one side in the axial direction from the bottom wall 17a. In the embodiment, the pin section 71 is provided integrally with one rib section 17f among the plurality of rib sections 17f. That is, the pin section 71 and the one rib section 17f are a portion of a single member. The pin section 71 is located between an inner end in the radial direction and an outer end in the radial direction of the one rib section 17f.

The pin section 71 is inserted into a positioning hole 43, which will be described later, of the inverter substrate 40. An end of the pin section 71 on one side in the axial direction is inserted into the positioning hole 43. The end of the pin section 71 on one side in the axial direction projects to one side in the axial direction beyond the end surfaces of the pillar sections 12g on one side in the axial direction. The pin section 71 faces at least one pillar section 12g from among the plurality of pillar sections 12g with a gap therebetween when seen in the axial direction. That is, the pin section 71 is disposed to approach at least one pillar section 12g with a gap therebetween when seen in the axial direction. The pin section 71 has an outer diameter decreasing in a stepwise manner from the bottom wall 17a toward one side in the axial direction. According to the embodiment, it is possible to position the inverter substrate 40 and the inverter housing section 13 by the pin section 71 being inserted into the positioning hole 43 of the inverter substrate 40. Also, it is possible to curb rotation of the inverter substrate 40 along with the screw members 60 when the inverter substrate 40 is fixed to the pillar sections 12g with the screw members 60, and the inverter substrate 40 is prevented from rotating relative to the inverter housing section 13.

The boss section 17j projects from the bottom wall 17a toward one side in the axial direction. The boss section 17j extends in the axial direction. The boss section 17j has a tubular shape or a columnar shape. In the embodiment, the boss section 17j has a cylindrical shape. A tip end surface of the boss section 17j directed on one side of the boss section 17j in the axial direction has a plane shape perpendicular to the central axis J. The tip end surface of the boss section 17j is brought into contact with the other plate surface of the inverter substrate 40 or faces the other plate surface of the inverter substrate 40 with a gap therebetween. The boss section 17j can support the other plate surface of the inverter substrate 40. The boss section 17j is disposed at the center of the inverter substrate 40 in a plan view of the inverter substrate 40. The bearing holder 17c and the boss section 17j are disposed in a superimposed manner in a plan view of the inverter substrate 40.

The insertion hole 17k is recessed on one side in the axial direction from the surface of the bottom wall 17a directed to the other side in the axial direction. The insertion hole 17k extends in the axial direction. The insertion hole 17k overlaps the axis section attachment hole 12m and the axis section 33 when seen in the axial direction. The axis section 33 is inserted into the insertion hole 17k. According to the embodiment, the second member 17 is positioned in the radial direction relative to the motor housing section 12 by the fitting tubular section 17d being fitted into the accommodation tubular section 12a. Also, relative positions between the motor housing section 12 and the inverter housing section 13 are stably determined, and connection of the first ends 29a of the coils 29, which will be described later, and the terminals 51 to the inverter substrate 40 is facilitated by the axis section 33 being inserted into the insertion hole 17k, thereby positioning the second member 17 in the circumferential direction relative to the motor housing section 12. Also, the axis section 33 and the pin section 71 are disposed in a superimposed manner when seen in the axial direction. According to the embodiment, since the axis section 33 and the pin section 71 are coaxially disposed, it is possible to save space for a positioning structure using these components.

The breather accommodation wall 171 is recessed on one side in the axial direction from the surface of the bottom wall 17a directed to the other side in the axial direction. The breather accommodation wall 171 has a capped tubular shape. The breather accommodation wall 171 has a circumferential wall and a top wall. The circumferential wall of the breather accommodation wall 171 extends from the bottom wall 17a toward one side in the axial direction. The top wall of the breather accommodation wall 171 blocks an opening in the circumferential wall of the breather accommodation wall 171 on one side in the axial direction. The breather accommodation wall 171 overlaps the breather attachment hole 12i when seen in the axial direction. The tubular disposition hole 17m penetrates through the bottom wall 17a in the axial direction. Extending tubular sections 85b, which will be described later, of the coil support 80 are disposed inside the tubular disposition hole 17*m*.

The circumferential wall 17*b* has a tubular shape extending on one side in the axial direction from an outer circumferential portion of the bottom wall 17*a*. In the embodiment, the circumferential wall 17*b* has a substantially polygonal tubular shape. The circumferential wall 17*b* has spacers 17*h* and a connector section 17*i*. That is, the inverter housing section 13 has a connector section 17*i*.

The spacers 17*h* have tubular shapes extending in the axial direction. In the embodiment, the spacers 17*h* have cylindrical shapes. The spacers 17*h* are provided on the circumferential wall 17*b* and penetrate through the second member 17 in the axial direction. The number of spacers 17*h* provided is a plural number. The plurality of spacers 17*h* are disposed at intervals from each other in the circumferential direction. The fastening screws 18 are inserted into the respective spacers 17*h*. The spacers 17*h* are made of metal. When the second member 17 is injection-molded, the spacers 17*h* are disposed in a mold, which is not illustrated in the drawings, along with other metal components. The second member 17 is insertion-molded along with the spacers 17*h* by filling the mold with a molten resin and solidifying the resin.

An external power source, which is not illustrated in the drawing, is connected to the connector section 17*i*. The connector section 17*i* has a tubular shape. In the embodiment, the connector section 17*i* has a square tubular shape. The connector section 17*i* extends from the circumferential wall 17*b* outward from the circumferential wall 17*b* when seen in the axial direction. The connector section 17*i* projects outward from the circumferential wall 17*b* along a virtual plane, which is not illustrated in the drawing, perpendicular to the central axis J. In the embodiment, the direction in which the connector section 17*i* projects from the circumferential wall 17*b* will be referred to as a projecting direction in some cases. The projecting direction of the connector section 17*i* corresponds to toward the +X side. The side opposite to the projecting direction corresponds to toward the X side. Also, a direction orthogonal to the projecting direction when seen in the axial direction will be referred to as a width direction in some cases. The width direction is a Y-axis direction. The connector section 17*i* is disposed at a position that is different from that of the central axis J in the width direction. In the width direction, the direction from the central axis J toward the connector section 17*i* will be referred to as toward one side (+Y side) in the width direction, and the direction from the connector section 17*i* toward the central axis J will be referred to as toward the other side (−Y side) in the width direction.

The connector section 17*i* and the circumferential wall 17*b* are a portion of a single member. A part of the wiring members 50 is disposed inside the connector section 17*i*. The connector section 17*i* is fixed to the wiring members 50. The connector section 17*i* holds the wiring members 50.

The wiring member disposition region 13*a* is a space in which the wiring members 50 are disposed in the inverter housing section 13. The wiring member disposition region 13*a* is located between the central axis J and the connector section 17*i* in the projecting direction in a plan view of the inverter substrate 40 in the inner space of the inverter housing section 13. That is, the wiring member disposition region 13*a* is located between the central axis J and the connector section 17*i* when seen in the axial direction. The wiring member disposition region 13*a* is located in the projecting direction (+X side) beyond the central axis J and is located on the side (−X side) opposite to the projecting direction beyond the connector section 17*i*.

The coil support accommodation space 13*b* is disposed inside the inverter housing section 13. The coil support accommodation space 13*b* accommodates the coil support 80. The coil support accommodation space 13*b* is a space in which the coil support 80 is disposed in the inner space of the inverter housing section 13. The coil support accommodation space 13*b* has an annular shape around the central axis J. The coil support accommodation space 13*b* overlaps the stator 26 when seen in the axial direction. The coil support accommodation space 13*b* is located on the inside of the fitting tubular section 17*d* in the radial direction. The coil support accommodation space 13*b* is a groove-shaped space that is recessed on one side in the axial direction from the surface of the bottom wall 17*a* directed to the other side in the axial direction and extends in the circumferential direction.

The heat conductive sheets 13*c* have plate shapes, and a pair of plate surfaces thereof are directed in the axial direction. The heat conductive sheets 13*c* are sheet members with elasticity. The heat conductive sheets 13*c* have square plate shapes, for example. The heat conductive sheets 13*c* are disposed between the first member 16 or the second member 17 and the inverter substrate 40 and are brought into contact with the first member 16 or the second member 17 and the inverter substrate 40. In the embodiment, the heat conductive sheets 13*c* are disposed between the first member 16 and the inverter substrate 40 and are brought into contact with the first member 16 and the inverter substrate 40. Specifically, the heat conductive sheets 13*c* are disposed between the top wall 16*a* and one plate surface of the inverter substrate 40 and are brought into contact with the top wall 16*a* and the one plate surface of the inverter substrate 40. Although not particularly illustrated in the drawing, the heat conductive sheets 13*c* are disposed between a metal portion (metal member) or the like, which is not illustrated in the drawing, included in the bottom wall 17*a* and the other plate surface of the inverter substrate 40 and are brought into contact with the metal portion or the like of the bottom wall 17*a* and the other plate surface of the inverter substrate 40 in a case in which the heat conductive sheets 13*c* are disposed between the second member 17 and the inverter substrate 40 and are brought into contact with the second member 17 and the inverter substrate 40. The heat conductive sheets 13*c* are thermally connected to the heat generating element 46, which will be described later, of the inverter substrate 40. The heat conductive sheets 13*c* have a function of causing heat of the heat generating element 46 to transfer to another member through heat conduction and cooling the heat generating element 46. Configurations, effects, and advantages of the heat conductive sheets 13*c* other than those described above will be separately described below along with description of the inverter substrate 40.

The breather section 14 establishes communication between the inside and the outside of the housing 11. The breather section 14 is provided at the brim section 12*b* of the motor housing section 12 and is exposed to the outside of the device from the housing 11 toward the other side in the axial direction. That is, the breather section 14 is disposed at the brim section 12*b*. The brim section 12*b* is covered with the inverter housing section 13 from one side in the axial direction and is directed to the other side in the axial direction, that is, the side of a member of the vehicle, which is not illustrated in the drawing, to which the electric pump device 1 is fixed. Therefore, the brim section 12*b* is surrounded by the inverter housing section 13 and members of the vehicle in the axial direction. According to the embodiment, it is possible to curb direct adhesion of water drops or the like flying due to traveling or the like of the vehicle to the breather section 14. Therefore, the members in the housing 11 are unlikely to be brought into contact with water or the like, and functions of the inverter substrate 40, the motor 20, and the like are satisfactorily maintained.

The breather section 14 is disposed at a position at which the breather section 14 does not overlap leg sections 97, which will be described later, of a pump cover 95 when seen in the axial direction. According to the embodiment, since the breather section 14 does not overlap the leg sections 97 in the axial direction, inspection for the sealing function of the housing 11 can be easily performed at an attachment location of the breather section 14, that is, from the breather attachment hole 12i of the brim section 12b, for example. That is, it is easy to attach a jig or the like of an inspection device, which is not illustrated in the drawing, to the breather attachment hole 12i and to remove the jig or the like therefrom. In addition, it is easy to attach the breather section 14 to the breather attachment hole 12i after the inspection.

The breather section 14 is disposed at a position at which the breather section 14 overlaps the wiring member disposition region 13a in the brim section 12b when seen in the axial direction. In the embodiment, the breather section 14 is disposed on the other side (−Y side) in the width direction beyond the central axis J in the wiring member disposition region 13a. Also, the breather section 14 may be disposed on one side (+Y side) in the width direction beyond the central axis J in the wiring member disposition region 13a. Since the wiring member disposition region 13a accommodates the wiring members 50, a wide space is likely to be secured. According to the embodiment, since the breather section 14 is disposed at a position at which the breather section 14 overlaps the wiring member disposition region 13a in the brim section 12b when seen in the axial direction, it is possible to take advantage of the vacant space in the housing 11, to optimize disposition of configuration members in the device, and to reduce the electric pump device 1 in size.

Although not particularly illustrated in the drawing, the breather section 14 is disposed above the center of the electric pump device 1 in the vertical direction in a state in which the electric pump device 1 is attached to the members of the vehicle. Therefore, it is possible to curb dropping of the breather section 14 into water. Also, high-temperature air in the housing 11 can be easily caused to escape to the outside of the device through the breather section 14. The disposition of the breather section 14 above the center of the electric pump device 1 in the vertical direction can also be explained using the relative positional relationships between an inlet port 96a and an outlet port 96b, which will be described later, of the pump cover 95. The description will be given later along with description of the pump cover 95.

The breather section 14 has a breather main body 14a, a breather tubular section 14b, claw sections 14c, and a breather sealing member 14e. The breather main body 14a has a circular plate shape with an inner space. In the following description, the central axis of the breather main body 14a will be referred to as a breather central axis C. The breather central axis C extends so as to be parallel to the central axis J, that is, in the axial direction. A radial direction around the breather central axis C will be referred to as a breather radial direction. In the breather radial direction, a direction toward the breather central axis C will be referred to as inward in the breather radial direction, and a direction away from the breather central axis C will be referred to as outward in the breather radial direction. A circumferential direction around the breather central axis C, that is, turning around the breather central axis C will be referred to as a breather circumferential direction.

The surface of the breather main body 14a directed to one side in the axial direction faces the bottom surface of the breather accommodation recessed section 12j directed to the other side in the axial direction with a gap therebetween in the axial direction. The outer circumferential surface of the breather main body 14a faces the inner circumferential surface of the breather accommodation recessed section 12j with a gap therebetween in the breather radial direction. The breather main body 14a has a portion accommodated in the breather accommodation recessed section 12j.

The breather main body 14a has breathing holes 14d. The breathing holes 14d communicate with the outside of the housing 11. The breathing holes 14d communicate with the inner space of the breather main body 14a. The plurality of breathing holes 14d are provided at intervals from each other in the breather circumferential direction. The plurality of breathing holes 14d include breathing holes 14d extending in the breather radial direction and breathing holes 14d extending in the axial direction. The plurality of breathing holes 14d include breathing holes 14d opening in the outer circumferential surface of the breather main body 14a and breathing holes 14d opening in the surface of the breather main body 14a directed to one side in the axial direction.

The breather tubular section 14b has a tubular shape extending in the axial direction. The breather tubular section 14b is connected to the breather main body 14a. The breather tubular section 14b is connected to the surface of the breather main body 14a directed to one side in the axial direction and extends from the breather main body 14a toward one side in the axial direction. The breather tubular section 14b is inserted into the breather attachment hole 12i. The breather tubular section 14b communicates with the breathing holes 14d through the inner space of the breather main body 14a. That is, the breather tubular section 14b communicates with the breathing holes 14d. The breather tubular section 14b communicates with the inside of the inverter housing section 13 through the through-holes 17e or the like in the bottom wall 17a. That is, the breather tubular section 14b communicates with the inside of the housing 11.

The claw sections 14c project outward in the breather radial direction from an end of the breather tubular section 14b on one side in the axial direction. The plurality of claw sections 14c are provided at intervals from each other in the circumferential direction. The claw sections 14c are brought into contact with the brim section 12b from one side in the axial direction. The claw sections 14c are brought into contact with the claw support surface 12k of the brim section 12b from one side in the axial direction. That is, the claw sections 14c are brought into contact with the claw support surface 12k. The claw sections 14c are hooked at the claw support surface 12k with a snap-fit structure or the like. According to the embodiment, since the claw support surface 12k is disposed on one side in the axial direction beyond the outer surrounding surface 12l, it is possible to easily work the claw support surface 12k with a cutting tool or the like. In this manner, precision of the position of the claw support surface 12k in the axial direction and a worked surface is secured. In addition, it is possible to stably hook the claw sections 14c at the claw support surface 12k. In addition, the fixed state of the breather section 14 relative to the brim section 12b is further stabilized.

Here, the breather accommodation wall 171 accommodates the end of the breather tubular section 14b on one side in the axial direction and the claw sections 14c and covers the breather tubular section 14b from one side in the axial direction. The top wall of the breather accommodation wall 171 faces the end of the breather tubular section 14b on one side in the axial direction and the claw sections 14c with a gap therebetween on one side in the axial direction. The circumferential wall of the breather accommodation wall 171 faces the end of the breather tubular section 14b on one side in the axial direction and the claw sections 14c with a gap therebetween from the outside in the breather radial direction. According to the embodiment, it is possible to curb direct adhesion of water or the like to electronic components and the like in the housing 11 with the breather accommodation wall 171 even in a case in which water or the like invades the housing 11 from the outside of the device through the breather section 14.

The breather sealing member 14e is, for example, an O ring or the like. The breather sealing member 14e is brought into contact with the outer circumferential surface of the breather tubular section 14b, the surface of the breather main body 14a directed to one side in the axial direction, and the inner circumferential surface of the breather attachment hole 12i. According to the embodiment, invasion of water or the like into the housing 11 through a portion between the breather tubular section 14b and the breather attachment hole 12i is curbed with the breather sealing member 14e. In addition, an attachment state of the breather section 14 relative to the brim section 12b is further stabilized.

The motor 20 has a rotor 21, a stator 26, and the plurality of bearings 35 and 36. The rotor 21 has a shaft 22, a rotor core 23, magnets 24, and a magnet holder 25.

The shaft 22 extends along the central axis J. The shaft 22 extends in the axial direction around the central axis J. The shaft 22 rotates about the central axis J. The shaft 22 is rotatably supported about the central axis J with the plurality of bearings 35 and 36. That is, the plurality of bearings 35 and 36 rotatably support the shaft 22. The plurality of bearings 35 and 36 are, for example, ball bearings or the like. The first bearing 35 of the plurality of bearings 35 and 36 supports a portion located on the other side in the axial direction beyond the rotor core 23 of the shaft 22. The second bearing 36 of the plurality of bearings 35 and 36 supports a portion located on one side in the axial direction beyond the rotor core 23 of the shaft 22.

The rotor core 23 is fixed to an outer circumferential surface of the shaft 22. The rotor core 23 has an annular shape extending in the circumferential direction around the central axis J. The rotor core 23 has a tubular shape extending in the axial direction. The rotor core 23 is a steel plate laminated body obtained by a plurality of electromagnetic steel sheets being laminated in the axial direction, for example.

The magnets 24 are disposed in an outer side surface of the rotor core 23 in the radial direction. The number of magnets 24 provided is a plural number. The plurality of magnets 24 are disposed at intervals from each other in the circumferential direction in the outer side surface of the rotor core 23 in the radial direction. Also, a single cylindrical ring magnet, for example, may be employed for the magnets 24.

The magnet holder 25 is provided at the rotor core 23 and holds the magnets 24. The magnet holder 25 fixes the magnets 24 to the rotor core 23. The magnet holder 25 is disposed in the outer side surface in the radial direction and the surface directed to the other side in the axial direction of the rotor core 23. The magnet holder 25 presses the magnets 24 from the outside in the radial direction and the other side in the axial direction. The magnet holder 25 has a portion that is located between a pair of magnets 24 that are adjacent in the circumferential direction and extends in the axial direction and a portion that has an annular shape around the central axis J and is located on the other side of the magnets 24 in the axial direction.

The stator 26 is disposed on the outside of the rotor 21 in the radial direction and faces the rotor 21 with a gap therebetween in the radial direction. That is, the stator 26 faces the rotor 21 in the radial direction. The stator 26 surrounds the rotor 21 from the outside in the radial direction over the entire circumference in the circumferential direction. The stator 26 has a stator core 27, an insulator 28, and a plurality of coils 29.

The stator core 27 has an annular shape around the central axis J. The stator core 27 surrounds the rotor 21 on the outside of the rotor 21 in the radial direction. The stator core 27 is disposed on the outside of the rotor 21 in the radial direction and faces the rotor 21 with a gap therebetween in the radial direction. The stator core 27 is a steel sheet laminated body obtained by a plurality of electromagnetic steel sheets being laminated in the axial direction, for example.

The stator core 27 has a core back 27a and a plurality of teeth 27b. The core back 27a has an annular shape around the central axis. The core back 27a has a tubular shape extending in the axial direction. The outer side surface of the core back 27a in the radial direction is fixed to the inner circumferential surface of the accommodation tubular section 12a. The teeth 27b extend inward in the radial direction from the inner side surface of the core back 27a in the radial direction. The plurality of teeth 27b are disposed at intervals from each other in the circumferential direction in the inner side surface of the core back 27a in the radial direction. The inner side surfaces of the teeth 27b in the radial direction face the outer side surfaces of the magnets 24 in the radial direction with gaps therebetween from the outside in the radial direction.

The insulator 28 is mounted on the stator core 27. The insulator 28 has a portion that covers the plurality of teeth 27b. A material for the insulator 28 is an insulating material such as a resin, for example. The coils 29 are attached to the stator core 27. The coils 29 are mounted in the stator core 27 via the insulator 28. The plurality of coils 29 are formed by winding conductive wires around the respective teeth 27b via the insulator 28.

Although not particularly illustrated in the drawing, the plurality of coils 29 include a first coil and a second coil. The first coil has a first conductive wire. The second coil has a second conductive wire that is different from the first conductive wire. That is, the first coil and the second coil are in mutually different phases. In the embodiment, the motor 20 has a three-phase motor. The three phases mean a U phase, a V phase, and a W phase. In the case of the three-phase motor, the conductive wires that form the respective coils 29 in the U phase, the V phase, and the W phase are different from each other. That is, the conductive wire for the coil 29 in the U phase, the conductive wire for the coil 29 in the V phase, and the conductive wire for the coil 29 in the W phase are different from each other. In a case in which the first coil is in the U phase, for example, the second coil is in either the V phase or the W phase. In a case in which the second coil is in the U phase, the first coil is in either the V phase or the W phase.

The coils 29 have a pair of ends drawn from the coils 29 at both ends of the conductive wires of the coils 29. The pair of ends are a first end 29a and a second end 29b. The ends 29a an 29b of the conductive wires of the coils 29 may be referred to as drawn portions of the coils 29 instead. The first end 29a is connected directly to the inverter substrate 40. The second end 29b is connected to a neutral point busbar 81, which will be described later, of the coil support 80.

Figure 9:
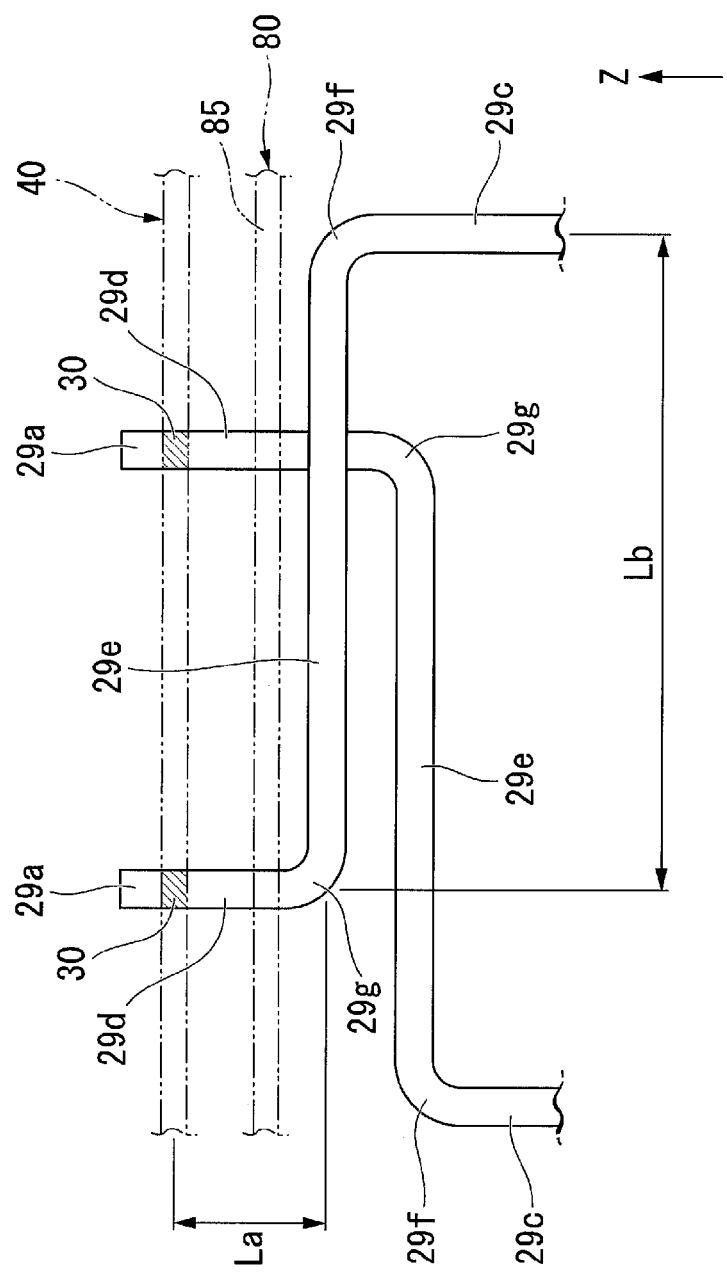
FIG. 9 is a side view schematically illustrating a portion near a first end of a coil.

The first end 29a has a first extending section 29c, a second extending section 29d, and a third extending section 29e (see FIG. 9). The first extending section 29c extends on one side in the axial direction from the coils 29. The second extending section 29d is connected to the inverter substrate 40 and extends in the axial direction. The second extending section 29d is joined to the inverter substrate 40 using the solder 30. The third extending section 29e connects one end of the first extending section 29c in the axial direction and the other end of the second extending section 29d in the axial direction and extends in a direction perpendicularly intersecting the central axis J. That is, in the embodiment, the first end 29a of the coils 29 has a plurality of bending sections 29f and 29g. Specifically, the first end 29a has a bending section 29f that is located at a connecting portion between the first extending section 29c and the third extending section 29e and a bending section 29g that is located at a connecting portion between the second extending section 29d and the third extending section 29e. Therefore, vibration is damped in the process of reaching the second extending section 29d from the first extending section 29c via the third extending section 29e when vibration from the outside or the inside of the device has been delivered to the first extending section 29c. Specifically, an amplitude of at least a component in the axial direction in the vibration is reduced, and the vibration is then delivered to the inverter substrate 40. In this manner, a load on the solder 30 that joins the second extending section 29d to the inverter substrate 40 is reduced, and durability of the solder 30 is improved.

At the first ends 29a, a length Lb of the conductive wire of the third extending section 29e is longer than a length La of the conductive wire of the second extending section 29d between the inverter substrate 40 and the third extending section 29e. According to the embodiment, the effect of damping the vibration at the first ends 29a of the coils 29 is further enhanced. Durability of the solder 30 that joins the first ends 29a to the inverter substrate 40 is further enhanced.

The two first ends 29a illustrated in FIG. 9 is the first end 29a of the first coil and the first end 29a of the second coil. That is, the two first ends 29a illustrated in FIG. 9 are in mutually different phases. The third extending section 29e of the first coil and the third extending section 29e of the second coil overlap each other when seen in the axial direction, and the third extending section 29e of the first coil an the third extending section 29e of the second coil are disposed so as to be separated from each other in the axial direction. According to the embodiment, since the two third extending sections 29e overlap each other when seen in the axial direction, it is possible to shorten the length by which each first end 29a is arranged in the direction perpendicularly intersecting the central axis J and to curb mutual contact between the first ends 29a in mutually different phases in the axial direction. In this manner, the performance of the motor 20 is satisfactorily maintained.

The inverter substrate 40 is disposed on one side of the motor 20 in the axial direction. The inverter substrate 40 is electrically connected to an external power source, which is not illustrated in the drawing, via the wiring members 50. The inverter substrate 40 is electrically connected to the motor 20. The inverter substrate 40 supplies electric power supplied from the external power source to the stator 26 of the motor 20. The inverter substrate 40 controls a current to be supplied to the motor 20.

The inverter substrate 40 has a polygonal shape in a plan view of the inverter substrate 40 and has a plurality of corners 45a, 45b, . . . . In the embodiment, the inverter substrate 40 has a substantially pentagonal shape in a plan view of the inverter substrate 40, and the inverter substrate 40 has five corners 45a, 45b, . . . . In the embodiment, a corner located on one side (+Y side) of the inverter substrate 40 in the width direction and also in the projecting direction (+X side) in a plan view of the inverter substrate 40 will be referred to as a first corner 45a among the plurality of corners 45a, 45b, . . . . The first corner 45a is located on one side in the width direction beyond the central axis J and also in the projecting direction. In addition, the second corner 45b is a corner located on the other side (−Y side) of the inverter substrate 40 in the width direction and also on the side (−X side) opposite to the projecting direction in a plan view of the inverter substrate 40. The second corner 45b is located on the other side in the width direction beyond the central axis J and also on the side opposite to the projecting direction. A third corner is located on the other side in the width direction beyond the central axis J and also in the projecting direction in a plan view of the inverter substrate 40. A fourth corner and a fifth corner are located on one side in the width direction beyond the central axis J and also on the side opposite to the projecting direction in a plan view of the inverter substrate 40.

The inverter substrate 40 has a plurality of heat generating elements 46, capacitors 47, a drawn section insertion hole 48, terminal insertion holes 41, screw insertion holes 42, and a positioning hole 43. Also, the inverter substrate 40 has a coil connecting region 40a and a terminal connecting region 40b. The plurality of heat generating elements 46 are mounted on the inverter substrate 40 and are disposed at intervals from each other. The heat generating elements 46 are, for example, field effect transistors (FETs), a pre-driver, a low-drop out-regulator (LDO), or the like. In the embodiment, the heat generating elements 46 are disposed on the other plate surface of the inverter substrate 40.

Here, the heat conductive sheets 13c will be described. In the embodiment, the number of heat conductive sheets 13c provided is a plural number. That is, the inverter housing section 13 has a plurality of heat conductive sheets 13c. The plurality of heat conductive sheets 13c are individually disposed at positions at which the heat conductive sheets 13c overlap the plurality of heat generating elements 46 in a plan view of the inverter substrate 40. In the embodiment, each heat conductive sheet 13c overlaps one heat generating element 46 in a plan view of the inverter substrate 40. That is, one heat conductive sheet 13c is disposed in a superimposed manner with one heat generating element 46. The heat conductive sheet 13c and the heat generating element 46 overlap each other in a one-to-one correspondence when seen in the axial direction.

As compared with a configuration in which a single heat conductive sheet with a large area is brought into contact with all the heat generating elements 46 unlike the embodiment, for example, contact locations between the heat conductive sheets 13c and the inverter substrate 40 are distributed, and the contact area is reduced in the embodiment. In this manner, a reaction force of the heat conductive sheets 13c is reduced, and deformation of the inverter substrate 40 is curbed. Also, performances and the like of electronic components, such as a ceramic capacitor, for example, mounted on the inverter substrate 40 are satisfactorily maintained. In addition, durability of the solder 30 that joins the first ends 29a of the coils 29 to the inverter substrate 40 is further improved. Durability of the solder 31 that fixes the inverter substrate 40 to the terminals 51, which will be described later, of the wiring members 50 is further enhanced.

Figure 10:
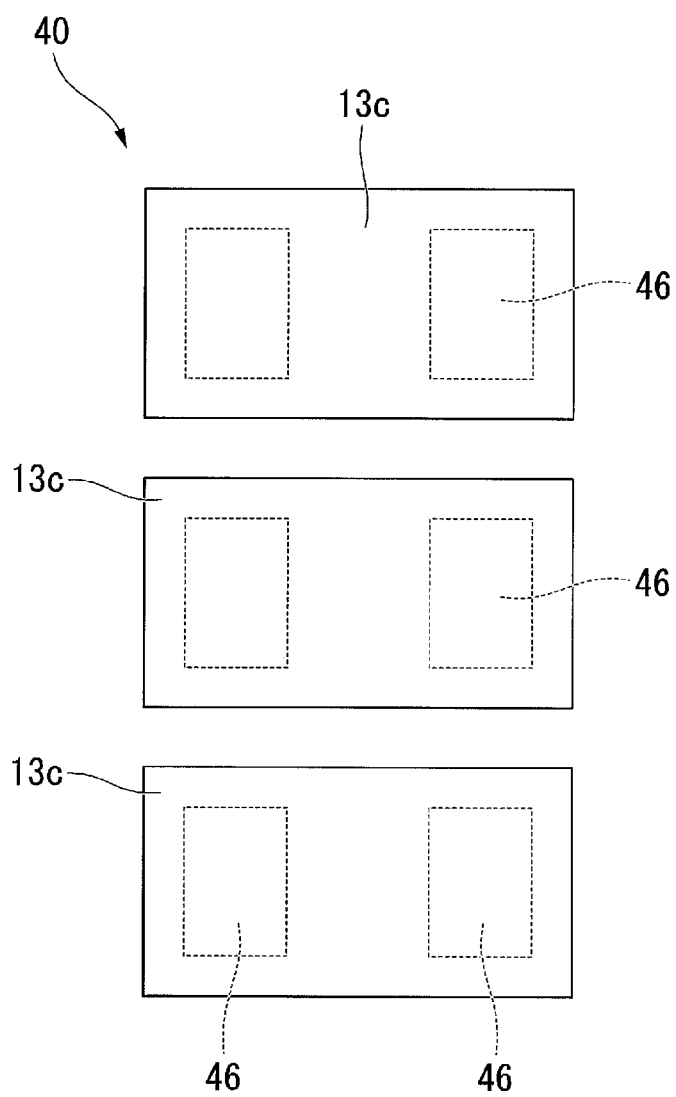
FIG. 10 is a plan view illustrating a modification example of the heat conductive sheet.

Here, FIG. 10 illustrates a modification example of the heat conductive sheets 13c according to the embodiment. In the modification example, each heat conductive sheet 13c overlaps two heat generating elements 46 in a plan view of the inverter substrate 40. That is, one heat conductive sheet 13c is disposed so as to overlap two heat generating elements 46. Since the contact locations between the heat conductive sheets 13c and the inverter substrate 40 are still distributed, and the contact area is still reduced in this case, deformation of the inverter substrate 40 is curbed.

At least one of the plurality of heat conductive sheets 13c is disposed between the first member 16 and the inverter substrate 40 and is brought into contact with the first member 16 and the inverter substrate 40. In the embodiment, all the plurality of heat conductive sheets 13c are disposed between the first member 16 and the inverter substrate 40 and are brought into contact with the first member 16 and the inverter substrate 40. According to the embodiment, the heat conductive sheets 13c are brought into contact with the inverter substrate 40 when the second member 17 is attached to the motor housing section 12 and the first member 16 is attached to the second member 17, that is, when assembly of the inverter housing section 13 ends. Since it is possible to support the inverter substrate 40 from both sides in the axial direction between the first member 16 and the second member 17 when the heat conductive sheets 13c are brought into contact with the inverter substrate 40, deformation of the inverter substrate 40 is more easily curbed.

According to the embodiment, the boss section 17j supports the other plate surface of the inverter substrate 40 when the first member 16 is attached to the second member 17 and the heat conductive sheets 13c press one plate surface of the inverter substrate 40. Therefore, deformation of the inverter substrate 40 is further curbed. Also, in the embodiment, the boss section 17j is supported by the bearing holder 17c made of metal in the axial direction. Therefore, the inverter substrate 40 is stably supported by the boss section 17j, and deformation of the inverter substrate 40 is further curbed.

Also, although not particularly illustrated in the drawing, at least one of the plurality of heat conductive sheets 13c may be disposed between the second member 17 and the inverter substrate 40 and may be brought into contact with the second member 17 and the inverter substrate 40.

The capacitors 47 are disposed on the other plate surface of the inverter substrate 40. The capacitors 47 extend from the other plate surface of the inverter substrate 40 toward the other side in the axial direction. In the embodiment, the number of capacitor 47 provided is a plural number. The capacitors 47 are disposed in a superimpose manner with the coil support 80 when seen in the axial direction.

Drawn section insertion holes 48 penetrate through the inverter substrate 40 in a plate thickness direction (in the axial direction) thereof. That is, the drawn section insertion holes 48 penetrate through the inverter substrate 40. The number of drawn section insertion holes 48 provided is a plural number. In the embodiment, the plurality of drawn section insertion holes 48 are linearly aligned in a plan view of the inverter substrate 40. The plurality of drawn section insertion holes 48 are disposed at an end of the inverter substrate 40 on the other side in the width direction and are aligned in the projecting direction. The first ends 29a of the coils 29 are inserted into the respective drawn section insertion holes 48. The first ends 29a of the coils 29 are joined to the inverter substrate 40 with the solder 30.

The terminal insertion holes 41 penetrate through the inverter substrate 40 in the plate thickness direction thereof. That is, the terminal insertion holes 41 penetrate through the inverter substrate 40. The number of terminal insertion holes 41 provided is a plural number. In the embodiment, the plurality of terminal insertion holes 41 are linearly aligned in a plan view of the inverter substrate 40. The plurality of terminal insertion holes 41 are disposed at an end of the inverter substrate 40 in the projecting direction (+X side) and are aligned in the width direction (Y-axis direction). The terminal insertion holes 41 are disposed at the first corner 45a. In other words, the corner at which the terminal insertion holes 41 are located among the plurality of corners 45a, 45b, . . . of the inverter substrate 40 is the first corner 45a. Terminals 51, which will be described later, of the wiring members 50 are inserted into the respective terminal insertion holes 41. The terminals 51 are joined to the inverter substrate 40 with the solder 31.

The screw insertion holes 42 penetrate through the inverter substrate 40 in the plate thickness direction thereof. That is, the screw insertion holes 42 penetrate through the inverter substrate 40. The screw insertion holes 42 are disposed in a superimposed manner with the female screw sections of the pillar sections 12g in a plan view of the inverter substrate 40, that is, when seen in the axial direction. The number of screw insertion holes 42 provided in the inverter substrate 40 is a plural number. The respective screw insertion holes 42 are disposed in a superimposed manner with the female screw sections of the respective pillar sections 12g when seen in the axial direction.

The screw insertion holes 42 are disposed at the plurality of corners 45a, 45b, . . . of the inverter substrate 40. At least one of the plurality of screw insertion holes 42 is disposed at the first corner 45a. In the embodiment, two screw insertion holes 42 are disposed at the first corner 45a. The terminal insertion hole 41 is disposed between two screw insertion holes 42 at the first corner 45a in a plan view of the inverter substrate 40. The terminal insertion hole 41 is located between the two screw insertion holes 42 in the width direction.

The positioning hole 43 penetrates through the inverter substrate 40 in the plate thickness direction thereof. That is, the positioning hole 43 penetrates through the inverter substrate 40 in the axial direction. In the embodiment, one positioning hole 43 is provided in the inverter substrate 40. The positioning hole 43 is disposed at a corner of the inverter substrate 40 in a plan view of the inverter substrate 40. The positioning hole 43 is disposed at the first corner 45a. The positioning hole 43 is disposed between the terminal insertion holes 41 and the outer circumferential end surface of the inverter substrate 40 in a plan view of the inverter substrate 40. In the embodiment, the positioning hole 43 is disposed between the terminal insertion holes 41 and the outer circumferential end surface directed to one side of the inverter substrate 40 in the width direction, in the width direction.

The positioning hole 43 faces one screw insertion hole 42 located on one side in the width direction beyond the terminal insertion holes 41 of the two screw insertion holes 42 at the first corner 45a, with a gap therebetween in the projecting direction in a plan view of the inverter substrate 40. That is, the screw insertion hole 42 at the first corner 45a and the positioning hole 43 face one another with a gap therebetween in a plan view of the inverter substrate 40.

The coil connecting region 40a is a region in which the ends 29a of the plurality of coils 29 are connected to the inverter substrate 40. In the embodiment, the coil connecting region 40a is disposed on the other side (−Y side) in the width direction beyond the central axis J in a plan view of the inverter substrate 40. The plurality of heat generating elements 46 are disposed in the coil connecting region 40a. Specifically, the plurality of heat generating elements, such as FETs, for example are disposed in the coil connecting region 40a. According to the embodiment, since the ends 29a of the plurality of coils 29 connected to the inverter substrate 40 and the plurality of heat generating elements 46 are disposed so as to be close to each other, it is possible to shorten a wiring pattern of the inverter substrate 40. In addition, it is possible to individually and efficiently cool the respective heat generating elements 46 with the respective heat conductive sheets 13c.

The terminal connecting region 40b is a region in which the terminals 51, which will be described later, of the wiring members 50 are connected to the inverter substrate 40. In the embodiment, the terminal connecting region 40b is disposed on one side (+Y side) in the width direction beyond the central axis J and also in the projecting direction (+X side) in a plan view of the inverter substrate 40. The terminal connecting region 40b is located at the first corner 45a. At least one of the heat generating elements 46 is disposed in the terminal connecting region 40b. In the embodiment, the plurality of heat generating elements 46 are disposed in the terminal connecting region 40b. Specifically, the heat generating elements such as FETs for protection from reverse connection or LDOs, for example, are disposed in the terminal connecting region 40b. According to the embodiment, since the terminals 51 connected to the inverter substrate 40 and the heat generating elements 46 are disposed so as to be close to each other, it is possible to shorten a wiring pattern of the inverter substrate 40. In addition, it is possible to individually and efficiently cool the heat generating elements 46 with the heat conductive sheets 13c.

The wiring members 50 extend across the outside and the inside of the second member 17 through the connector section 17i. That is, the wiring members 50 extend across the outside and the inside of the housing 11. The wiring members 50 are electrically connected to an external power source, which is not illustrated in the drawing. The wiring members 50 are electrically connected to the inverter substrate 40. In the embodiment, the wiring members 50 are made of metal and has a thin and long plate shape. The wiring members 50 may be referred to as a busbar instead. The number of wiring members 50 provided is a plural number.

The wiring members 50 have terminals 51 located at ends of the wiring members 50. The terminals 51 are provided at the respective wiring members 50, respectively. That is, the number of terminals 51 provided is a plural number. The terminals 51 are located at ends on one side, which are disposed inside the housing 11, of both ends of the wiring members 50. In the embodiment, each wiring member 50 is a single member, and each terminal 51 forms a part of the wiring member 50. The terminals 51 extend in the axial direction inside the inverter housing section 13. The terminals 51 are disposed at the first corner 45a of the inverter substrate 40 in a plan view of the inverter substrate 40. The terminals 51 are inserted into the terminal insertion holes 41. The terminals 51 are connected to the inverter substrate 40 using the solder 31.

The number of screw members 60 provided is a plural number. The screw members 60 are inserted into the screw insertion holes 42. The screw members 60 have male screw sections. The male screw sections of the screw members 60 inserted into the screw insertion holes 42 are screw-cramped to the female screw sections of the pillar sections 12g. That is, the screw members 60 are inserted into the screw insertion holes 42 and are fixed to the pillar sections 12g. The screw members 60 fix the inverter substrate 40 to the housing 11.

At least two screw members 60 of the plurality of screw members 60 are disposed in the terminal connecting region 40b. The terminal 51 is located between the two screw members 60 in a plan view of the inverter substrate 40. Specifically, the terminal 51 is disposed between the two screw members 60 in the width direction. According to the embodiment, it is possible to curb relative movement between the inverter substrate 40 and the terminals 51 due to thermal deformation, vibration, or the like and to enhance durability of the solder 31 that fixes the inverter substrate 40 to the terminals 51.

The coil support 80 is located between the motor 20 and the inverter substrate 40 in the axial direction. That is, the coil support 80 is disposed between the motor 20 and the inverter substrate 40. The coil support 80 supports the first ends 29a of the coils 29 between the motor 20 and the inverter substrate 40. The coil support 80 guides the first ends 29a of the coils 29 in the axial direction toward the inverter substrate 40. In addition, the coil support 80 supports the second ends 29b of the coils 29. The coil support 80 supports the second ends 29b with a neutral point busbar 81, which will be described later. The coil support 80 establishes electric connection among the second ends 29b of the plurality of coils 29 with the neutral point busbar 81. That is, the neutral point busbar 81 establishes electric connection among the plurality of coils 29.

The coil support 80 is accommodated in the coil support accommodation space 13b. The coil support accommodation space 13b, the coil support 80, and the bearing 36 are disposed in a superimposed manner when seen in the radial direction. According to the embodiment, it is possible to further reduce the electric pump device 1 in size in the axial direction. The coil support 80 has a capped double-tube shape. The coil support 80 has an inner tube, an outer tube, and a ceiling wall. The inner tube has a cylindrical shape extending in the axial direction. The outer tube has a cylindrical shape extending in the axial direction and surrounds the inner tube from the outside in the radial direction. The ceiling wall has a plate shape with a plate surface directed in the axial direction. The ceiling wall has a substantially annular plate shape. The inner circumferential portion of the ceiling wall is connected to the inner tube. The outer circumferential portion of the ceiling wall is connected to the outer tube. The coil support 80 is disposed in a superimposed manner with the stator 26 when seen in the axial direction. The coil support 80 is disposed in a superimposed manner with the plurality of coils 29 when seen in the axial direction.

The neutral point busbar 81 is made of metal. When the coil support 80 is injection-molded, the neutral point busbar 81 is disposed in a mold, which is not illustrated in the drawing. The coil support 80 is insertion-molded along with the neutral point busbar 81 by filling the mold with a molten resin and solidifying the resin. That is, the coil support 80 has a portion made of the resin.

The neutral point busbar 81 has coil end holding sections 81a and a holding section coupling bar 81b. The coil end holding sections 81a hold the second ends 29b of the coils 29. The coil end holding sections 81a have V shapes when seen in the axial direction. The number of coil end holding sections 81a provided is a plural number. The plurality of coil end holding sections 81a are disposed at intervals from each other in the circumferential direction. The coil end holding sections 81a are disposed between the inner tube and the outer tube of the coil support 80 in the radial direction. The holding section coupling bar 81b is incorporated in the inner tube of the coil support 80. The holding section coupling bar 81b has a plate shape with a plate surface directed in the axial direction and extends in the circumferential direction. The holding section coupling bar 81b is connected to the plurality of coil end holding sections 81a. The holding section coupling bar 81b establishes electric connection among the plurality of coil end holding sections 81a.

The coil support 80 has a first region 80a and a second region 80b. The first region 80a and the second region 80b are semi-circular regions, respectively, when seen in the axial direction (see FIG. 7). In the first region 80a, the first ends 29a of the coils 29 are disposed. In the second region 80b, the second ends 29b of the coils 29 and the neutral point busbar 81 are disposed. According to the embodiment, the first ends 29a disposed in the first region 80a of the coil support 80 are connected directly to the inverter substrate 40. That is, it is possible to dispose the motor 20 and the inverter substrate 40 so as to be closer to each other in the axial direction since a busbar member for connecting the ends of the coils to the inverter substrate is not used in the embodiment unlike the related art. Therefore, it is possible to reduce the electric pump device 1 in size in the axial direction. Also, it is possible to reduce the number of components and to reduce manufacturing costs.

The coil support 80 has a first wall 85 and a second wall 86. The first wall 85 and the second wall 86 respectively form a part of the ceiling wall of the coil support 80. The first wall 85 is disposed in the first region 80a. The first wall 85 has a plate surface directed in the axial direction. The first wall 85 has a coil end insertion holes 85a, extending tubular sections 85b, and window sections 85c.

The coil end insertion holes 85a penetrate through the first wall 85 in the axial direction. The coil end insertion holes 85a have circular hole shapes. The first ends 29a are inserted into the coil end insertion holes 85a. The number of coil end insertion holes 85a provided is a plural number. The plurality of coil end insertion holes 85a are aligned in the projecting direction (X-axis direction) in the first wall 85. The extending tubular sections 85b have tubular shapes extending on one side in the axial direction from the plate surface of the first wall 85 directed to one side in the axial direction. The inside of the extending tubular sections 85 is a part of the coil end insertion holes 85a. The number of extending tubular sections 85b provided is a plural number. The plurality of extending tubular sections 85b are aligned in the projecting direction in the first wall 85. In the embodiment, parts of outer circumferential surfaces of a pair of extending tubular sections 85b that are adjacent to each other are connected to each other.

According to the embodiment, it is possible to elongate the coil end insertion holes 85a on one side in the axial direction by the extending tubular sections 85b. Therefore, the coil end insertion holes 85a can guide the first ends 29a of the coils 29 to be closer to the inverter substrate 40. Therefore, connection of the first ends 29a to the inverter substrate 40 is facilitated. Also, insulation of the first ends 29a is easily secured in accordance with an increase in distance by which the coil end insertion holes 85a guide the first ends 29a in the axial direction. Also, the extending tubular sections 85b are disposed in the tubular section disposition hole 17m in the bottom wall 17a. According to the embodiment, it is possible to further reduce the electric pump device 1 in size in the axial direction.

The window sections 85c penetrate through the first wall 85 in the axial direction. The window sections 85c overlap arrangement sections, which are located on the other side of the first wall 85 in the axial direction, of the first ends 29a when seen in the axial direction. The arrangement sections are, for example, the third extending sections 29e. The number of window sections 85c provided is a plural number. In regard to at least one of the plurality of window sections 85c, arrangement sections of the plurality of coils 29 overlap each other in the window sections 85c when seen in the axial direction. According to the embodiment, the arrangement sections of the first ends 29a arranged on the other side of the first wall 85 in the axial direction can be viewed through the window sections 85c. Therefore, the first ends 29a can be stably arranged.

The second wall 86 is disposed in the second region 80b. The second wall 86 has a plate surface directed in the axial direction. The second wall 86 has coil end drawing holes 86a. The coil end drawing holes 86a penetrate through the second wall 86 in the axial direction. The second ends 29b are caused to pass through the coil end drawing holes 86a. That is, the second ends 29b pass through the coil end drawing holes 86a and are drawn on one side in the axial direction. The number of coil end drawing holes 86a provided is a plural number. The plurality of coil end drawing holes 86a are disposed at intervals from each other in the circumferential direction. The coil end drawing holes 86a and the coil end holding sections 81a overlap each other when seen in the axial direction. The second wall 86 is located on the other side in the axial direction beyond the coil end holding sections 81a.

The position of the first wall 85 in the axial direction is on one side in the axial direction beyond the position of the second wall 86 in the axial direction. In the embodiment, the first wall 85 supports the first ends 29a with the coil end insertion holes 85a and the extending tubular sections 85b. Since the first wall 85 is disposed so as to be closer to the inverter substrate 40 in the axial direction than the second wall 86, it is possible to stably connect the first ends 29a supported by the first wall 85 to the inverter substrate 40.

A connecting portion between the neutral point busbar 81 and the second ends 29b, that is, the coil end holding sections 81a is disposed on the other side in the axial direction beyond the plate surface directed to one side of the first wall 85 in the axial direction and is disposed on one side in the axial direction beyond the plate surface directed to one side of the second wall 86 in the axial direction. According to the embodiment, it is possible to reduce the coil support 80 in size in the axial direction and to reduce the electric pump device 1 in size in the axial direction.

The pump section 90 is driven by a motive power of the motor 20. The pump section 90 suctions and ejects a fluid such as an oil. The pump section 90 is disposed on the other side of the motor 20 in the axial direction. The pump section 90 is located at a portion of the electric pump device 1 on the other side in the axial direction. Although not particularly illustrated in the drawing, the pump section 90 is continuous with a flow path for a fluid, such as an oil, provided in a drive device or the like in the vehicle. Therefore, a portion of the electric pump device 1 on the other side in the axial direction on which the pump section 90 is located is fixed to a member of the vehicle.

In the embodiment, the pump section 90 has a trochoid pump structure. The pump section 90 has an inner rotor 91 and an outer rotor 92. Each of the inner rotor 91 and the outer rotor 92 has a trochoid tooth shape. The inner rotor 91 is fixed to an end of the shaft 22 on the other side in the axial direction. Also, relative turning of the inner rotor 91 and the shaft 22 about the central axis J may be allowed in a predetermined range. The outer rotor 92 is disposed on the outside of the inner rotor 91 in the radial direction. The outer rotor 92 surrounds the entire circumference of the inner rotor 91 in the circumferential direction from the outside in the radial direction.

The pump cover 95 is fixed to an end of the motor housing section 12 on the other side in the axial direction and covers the pump section 90 from the other side in the axial direction. That is, the pump cover 95 is fixed to the housing 11 and covers the pump section 90. The pump cover 95 is fixed to a member of the vehicle, which is not illustrated in the drawing. The surface of the pump cover 95 directed to the other side in the axial direction is brought into contact with the member of the vehicle. The pump cover 95 has a cover section 96 and leg sections 97.

The cover section 96 is disposed in a superimpose manner with the pump section 90 when seen in the axial direction and covers the pump section 90 on the other side in the axial direction. That is, the cover section 96 covers the pump section 90. The cover section 96 has an inlet port 96a and an outlet port 96b. The inlet port 96a and the outlet port 96b are continued to the pump section 90, respectively. The inlet port 96a is formed of a through-hole that penetrates through the cover section 96 in the axial direction. The inlet port 96a causes a fluid to flow into the pump section 90. That is, the pump section 90 suctions the fluid from the outside of the device through the inlet port 96a. The outlet port 96b is formed of a through-hole that penetrates through the cover section 96 in the axial direction. The outlet port 96b causes a fluid to flow out of the pump section 90. That is, the pump section 90 ejects the fluid to the outside of the device through the outlet port 96b. In the embodiment, the inlet port 96a and the outlet port 96b are aligned in the projecting direction when seen in the axial direction.

A direction from the inlet port 96a toward the outlet port 96b when seen in the axial direction is assumed to be a fluid feeding direction. The breather section 14 is disposed in the fluid feeding direction beyond the central axis J when seen in the axial direction (see FIG. 2). In the embodiment, the fluid feeding direction is the +X side and a direction that is the same as the projecting direction. Therefore, the projecting direction (+X side) may be referred to as a fluid feeding direction instead, and the side (−X side) opposite to the projecting direction may be referred to as a side opposite to the fluid feeding direction instead. When the electric pump device 1 is mounted in the vehicle, the inlet port 96a is disposed on the lower side in the vertical direction beyond a liquid surface of the fluid in order not to cause air entrainment or the like of the fluid, for example. The outlet port 96b is disposed on the upper side in the vertical direction beyond the inlet port 96a. That is, the fluid feeding direction is a direction including the upper side in the vertical direction. According to the embodiment, since the breather section 14 is disposed on the upper side in the vertical direction beyond the center of the electric pump device 1, it is possible to curb dropping of the breather section 14 in water. Also, it is possible to facilitate escape of hot air in the housing 11 to the outside of the device through the breather section 14.

The leg sections 97 are connected to the cover section 96 and are disposed outside the cover section 96 in the radial direction. The leg sections 97 project outward in the radial direction beyond the accommodation tubular section 12a. The plurality of leg sections 97 are provided in an aligned manner in the circumferential direction. The breather section 14 is disposed between a pair of leg sections 97 that are adjacent to each other in the circumferential direction when seen in the axial direction. Bolt insertion holes 97a are provided at outer ends of the respective leg sections 97 in the radial direction. The bolt insertion holes 97a penetrate through the leg sections 97 in the axial direction. The electric pump device 1 is fixed to the member of the vehicle using bolt members, which are not illustrated in the drawing, inserted into the bolt insertion holes 97a.

Also, the invention is not limited to the aforementioned embodiment, and modifications and the like of the configuration can be made without departing from the gist of the invention as will be described below, for example.

Although the projecting direction and the width direction have been defined in directions along virtual planes, which are not illustrated in the drawing, perpendicular to the central axis J in the aforementioned embodiment, the invention is not limited thereto. For example, a direction that is parallel to the projecting direction may be referred to as a "first direction" instead regardless of the direction in which the connector section 17i projects from the circumferential wall 17b. That is, the first direction is a predetermined direction among directions along virtual planes that are perpendicular to the central axis J. In this case, one side (+X side) in the first direction corresponds to the projecting direction, and the other side (−X side) in the first direction corresponds to the side opposite to the projecting direction. In addition, the width direction may be referred to as a "second direction" instead. That is, the second direction is a direction that is orthogonal to the first direction among the directions along the virtual planes that are perpendicular to the central axis J. In this case, one side (+Y side) in the second direction corresponds to one side in the width direction, and the other side (−Y side) in the second direction corresponds to the other side in the width direction. The fluid feeding direction may be referred to as a "first direction" instead in a similar manner.

In addition to the above description, the respective configurations (components) described in the aforementioned embodiment, modification examples, explanatory notes, and the like may be combined without departing from the gist of the invention, and addition, omission, replacement, and other changes of configurations can be made. In addition, the invention is not limited to the aforementioned embodiment and is limited only by the scope of the claims.

What is claimed is:
1. An electric pump device comprising:
a motor;
an inverter substrate that is electrically connected to the motor;
a housing that accommodates the motor and the inverter substrate; and
a pump section that is driven by motive power of the motor,
wherein the inverter substrate has a plurality of heat generating elements that are mounted on the inverter substrate and are disposed at intervals from each other, the housing has an inverter housing section that accommodates the inverter substrate,
the inverter housing section has
a first member that faces one plate surface of a pair of plate surfaces of the inverter substrate,
a second member that faces the other plate surface of the pair of surfaces, and
a plurality of heat conductive sheets that are disposed between the first member or the second member and the inverter substrate and is brought into contact with the first member or the second member and the inverter substrate,
the heat conductive sheets are thermally connected to the heat generating elements, and
the plurality of heat conductive sheets are individually disposed at positions at which the heat conductive sheets overlap the plurality of heat generating elements in a plan view of the inverter substrate.

2. The electric pump device according to claim 1,
wherein the housing has a motor housing section that accommodates the motor, the second member is disposed between the motor housing section and the first member, and
at least one of the plurality of heat conductive sheets is disposed between the first member and the inverter substrate and is brought into contact with the first member and the inverter substrate.

3. The electric pump device according to claim 2, wherein the second member has a boss section that is disposed at the center of the inverter substrate in a plan view of the inverter substrate and is able to support the other plate surface of the inverter substrate.

4. The electric pump device according to claim 3,
wherein the motor has
a rotor that has a shaft extending along a central axis,
a stator that faces the rotor in a radial direction, and
a plurality of bearings that rotatably support the shaft,
the second member has a bearing holder made of metal for holding at least one bearing among the plurality of bearings, and
the bearing holder and the boss section are disposed in a superimposed manner in a plan view of the inverter substrate.

5. The electric pump device according to claim 1,
wherein the motor has
a rotor that has a shaft extending along a central axis, and
a stator that faces the rotor in a radial direction,
the stator has a plurality of coils,
the inverter substrate has a coil connection region to which ends of the plurality of coils are connected, and
the plurality of heat generating elements are disposed in the coil connection region.

6. The electric pump device according to claim 1, further comprising:
a wiring member that extends across the outside and the inside of the housing,
wherein the wiring member has a terminal that is located at an end of the wiring member,
the inverter substrate has a terminal connection region to which the terminal is connected, and
at least one of the heat generating elements is disposed in the terminal connection region.

7. The electric pump device according to claim 6, further comprising:
a plurality of screw members that secure the inverter substrate to the housing,
wherein at least two screw members of the plurality of screw members are disposed in the terminal connection region, and
the terminal is located between the two screw members in a plan view of the inverter substrate.

8. The electric pump device according to claim 1,
wherein the housing has a motor housing section that accommodates the motor,
the second member is disposed between the motor housing section and the first member, and
at least one of the plurality of heat conductive sheets is disposed between the second member and the inverter substrate and is brought into contact with the second member and the inverter substrate.

9. The electric pump device according to claim 1, wherein each of the heat conductive sheets overlaps one or two of the heat generating elements in a plan view of the inverter substrate.

* * * * *